US012807410B2

(12) United States Patent
Itoh

(10) Patent No.: US 12,807,410 B2
(45) Date of Patent: Nov. 24, 2026

(54) STORAGE APPARATUS AND STORAGE METHOD

(71) Applicant: Aoi Seiki Co., Ltd., Kumamoto (JP)

(72) Inventor: Teruaki Itoh, Kumamoto (JP)

(73) Assignee: AOI SEIKI CO., LTD., Kumamoto (JP)

( * ) Notice: Subject to any disclaimer, the term of this patent is extended or adjusted under 35 U.S.C. 154(b) by 318 days.

(21) Appl. No.: 18/643,454

(22) Filed: Apr. 23, 2024

(65) Prior Publication Data

US 2024/0359918 A1 Oct. 31, 2024

(30) Foreign Application Priority Data

Apr. 28, 2023 (JP) ................................ 2023-074970

(51) Int. Cl.
*B65G 1/137* (2006.01)

(52) U.S. Cl.
CPC .................................. *B65G 1/137* (2013.01)

(58) Field of Classification Search
CPC ...................................................... B65G 1/137
See application file for complete search history.

(56) References Cited

U.S. PATENT DOCUMENTS 5,348,436 A * 9/1994 Hogenkamp ...... B65G 47/5109 414/794.9
2003/0156428 A1* 8/2003 Robey .................. B65G 1/1373 362/555
2013/0307381 A1* 11/2013 Itoh ........................ B65G 1/026 312/97
2014/0027242 A1* 1/2014 Engle ..................... B65G 1/133 198/347.2

FOREIGN PATENT DOCUMENTS

JP 2013-238486 A 11/2013
TW 202122328 A 6/2021

OTHER PUBLICATIONS

Extended European Search Report dated Sep. 2, 2024 in connection with European Patent Application No. EP24171481.5.
Office Action, including English language translation, dated Sep. 30, 2025, issued in connection with Taiwanese Patent Application No. 113115242.

* cited by examiner

*Primary Examiner* — Kyle O Logan
(74) *Attorney, Agent, or Firm* — John P. White

(57) ABSTRACT

According to an aspect of the invention, a storage apparatus, includes; a storage unit including a storage space configured to store a plurality of racks in a plurality of rows in a second direction intersecting a first direction, each of the racks holding a plurality of specimen containers in the first direction; and a plurality of movement units arranged in a plurality of levels in a third direction intersecting the first and second directions, each of the movement units being configured to: sequentially supply the rows of the racks supported by the storage unit to one side in the second direction toward a carry-in position by a predetermined pitch; move the racks in the third direction on a carry-in side; and sequentially withdraw the racks by the predetermined pitch to another side in the second direction.

7 Claims, 20 Drawing Sheets

| Apparatus 100A | | Storage apparatus 100 | |
|---|---|---|---|
| Apparatus area ($mm^2$) | 1098063 | Apparatus area ($mm^2$) | 1743161 |
| Area of single specimen container ($mm^2$) | 6.5*6.5*3.14≒133 | Area of single specimen container ($mm^2$) | 6.5*6.5*3.14≒133 |
| Total area of 5440 specimen containers ($mm^2$) | 723520 | Total area of 15120 specimen containers ($mm^2$) | 2010960 |
| Utilization rate per apparatus area | 66% | Utilization rate per apparatus area | 115% |

FIG. 20

STORAGE APPARATUS AND STORAGE METHOD

CROSS-REFERENCE TO RELATED APPLICATIONS

This application is based upon and claims the benefit of priority from prior Japanese Patent Application No. 2023-074970, filed Apr. 28, 2023, the entire contents of which are incorporated herein by reference.

FIELD

The present invention relates to a storage apparatus and a storage method for specimen containers.

BACKGROUND

A storage shelf configured to hold specimen containers capable of accommodating specimens such as blood in an upright state is known. A plurality of arrays of racks each configured to hold specimen containers in rows and columns, for example, are arranged in multiple levels in a height direction. In such a configuration, at the time of installing and storing specimen containers in the racks at each level, the specimen containers are moved above the racks provided on a floor at each level, and are inserted into holding holes at predetermined positions in the rack. Thus, the transfer arm needs to be horizontally moved above the racks at each floor, and a space for allowing the transfer arm to move and a space for taking in and out the specimen containers need to be provided at every floor. Accordingly, a plurality of floors arranged along the vertical direction need to be placed so as to be distanced from one another in the up/down direction, thus increasing the overall height of the apparatus. A configuration is also known in which a plurality of racks are moved to ascend and descend in the housing (e.g., Jpn. Pat. Appln KOKAI Publication No. 2013-238486).

SUMMARY

According to an aspect of the invention, a storage apparatus, comprises; a storage unit including a storage space configured to store a plurality of racks in a plurality of rows in a second direction intersecting a first direction, each of the racks holding a plurality of specimen containers in the first direction; and a plurality of movement units arranged in a plurality of levels in a third direction intersecting the first and second directions, each of the movement units being configured to: sequentially supply the rows of the racks supported by the storage unit to one side in the second direction toward a carry-in position by a predetermined pitch; move the racks in the third direction on a carry-in side; and sequentially withdraw the racks by the predetermined pitch to another side in the second direction.

According to another aspect of the invention, each of the racks is configured to hold the specimen containers at least in the first direction, the storage unit is configured to support the racks arrayed in a plurality of rows in the second direction, the carry-in position is placed at an end portion of the storage unit in the second direction, the movement unit includes: a first movement section configured to move the racks arranged in the second direction to the one side in the second direction at the predetermined pitch; a second movement section configured to move the racks arranged in the second direction to another side in the second direction at the predetermined pitch; and a third movement section configured to move the racks at the carry-in position in the third direction between the first movement section and the second movement section, and the first movement section and the second movement section are placed so as to be stacked in the third direction different from the first direction and the second direction.

According to another aspect of the invention, the storage apparatus further comprises; a transfer unit configured to transfer the specimen containers to the racks supplied to the carry-in position, wherein in the supplying or the withdrawing, the specimen containers are simultaneously moved in units of one or two rows in the second direction and five or more columns in the first direction.

According to another aspect of the invention, the storage apparatus further comprises; a fourth movement section configured to move, at an end portion opposite the carry-in position, the rack at another end portion in the second position to a direction away from the third movement section in the third direction.

According to another aspect of the invention, the first movement section includes; a supporting plate including a plurality of engaging portions arranged in parallel in a front/back direction and each configured to be engaged with and disengaged from an end portion of the rack in the first direction; and a moving plate including a plurality of engaging portions arranged in parallel in the front/back direction and each configured to be engaged with and disengaged from an end portion of the rack in a width direction, the moving plate being movable in the front/back direction and an ascending and descending direction relative to the supporting plate, wherein the moving plate repeatedly performs an advancement process of advancing the racks by moving along a traveling route of ascending, advancing, descending, and retracting at the predetermined pitch relative to the supporting plate in a state in which a plurality of engaging portions of the racks are set in the engaging portions of the supporting plate, thereby sequentially advancing the racks to the one side in the second direction.

According to another aspect of the invention, the carry-in position is disposed at a front-end portion of the storage unit, three or more of the racks are arrayed in the front/back direction in the storage unit, each of the racks is configured to accommodate the specimen containers in a width direction intersecting a direction of movement of the supplying and the withdrawing, and the storage apparatus further comprises; a control unit configured to perform, in parallel; a supplying step of causing the first movement section to move the rack from a back side to a front side; a retracting step of causing the second movement section to move the transferred rack to the back side; an ascending and descending step of causing the third movement section to move the rack in an up/down direction at a front end portion; and a carry-in step of causing the transfer unit to transfer the specimen containers in the width direction stored in the rack at the carry-in position of the front end portion.

According to another aspect of the invention, a plurality of the storage units are arranged in the first direction, and the storage apparatus further comprises; a housing configured to accommodate the storage units. According to another aspect of the invention, a storage method comprises performing, in parallel; sequentially supplying a plurality of racks supported by a storage unit at a predetermined pitch to a carry-in position of the storage unit, the storage unit including a storage space configured to store the racks, each of the racks holding at least one specimen container; transferring the specimen container to the rack supplied at the carry-in position; and sequentially moving the rack at the carry-in position to which the specimen containers have been transferred to the storage space at the predetermined pitch to withdraw the rack.

According to another aspect of the invention, the rack holds a plurality of specimen containers arranged in a first direction, the carry-in position is disposed at an end portion in a second direction in the storage space, and the racks are moved in the second direction through the supplying and the withdrawing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWING

FIG. 20 is an explanatory view showing storage efficiencies of the storage apparatus according to the embodiment and the storage apparatus according to the comparative example.

DETAILED DESCRIPTION

Figure 1:
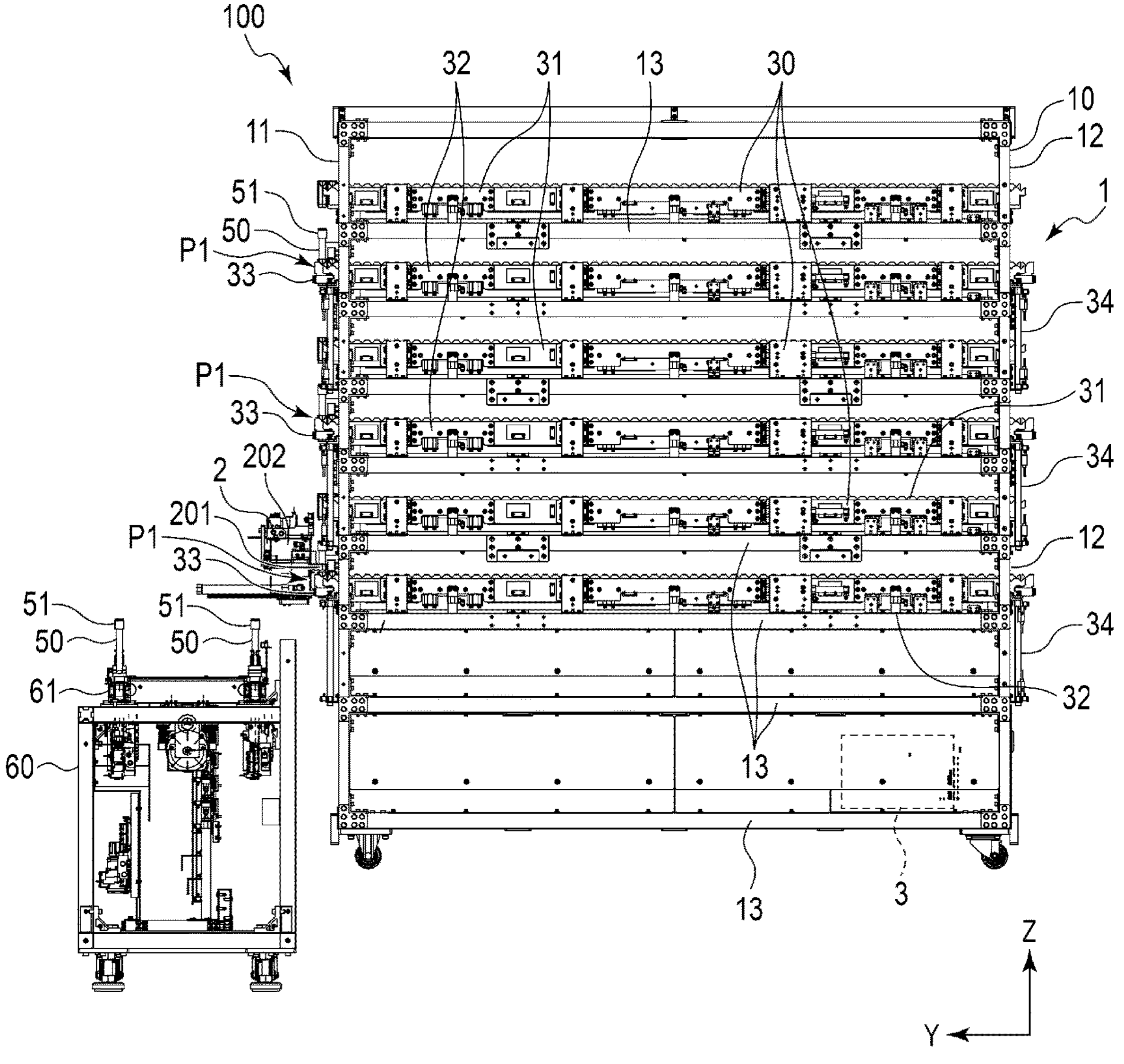
FIG. 1 is a side view of a storage apparatus according to a first embodiment of the present invention.
Figure 2:
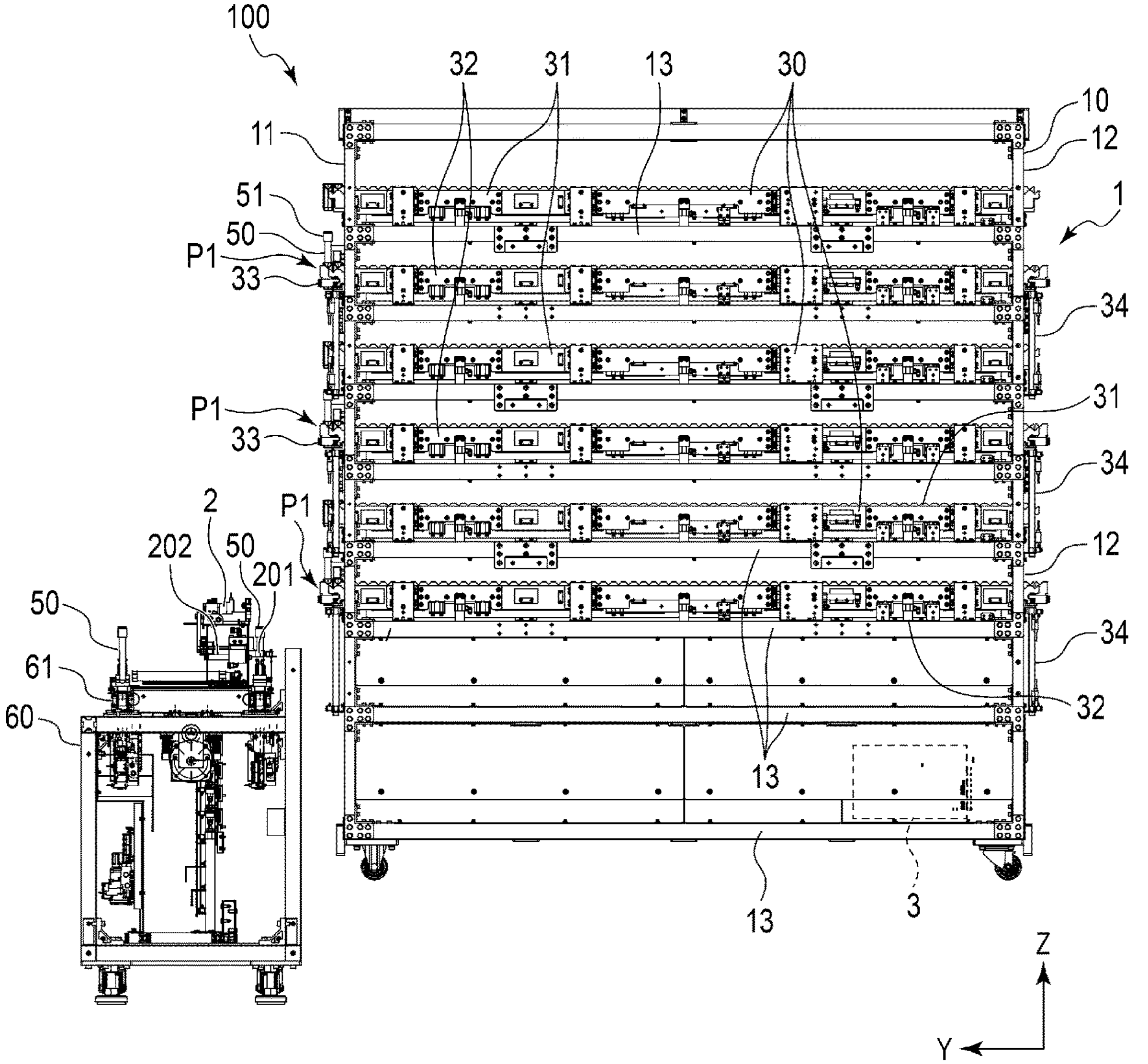
FIG. 2 is a side view of the storage apparatus according to the embodiment.
Figure 3:
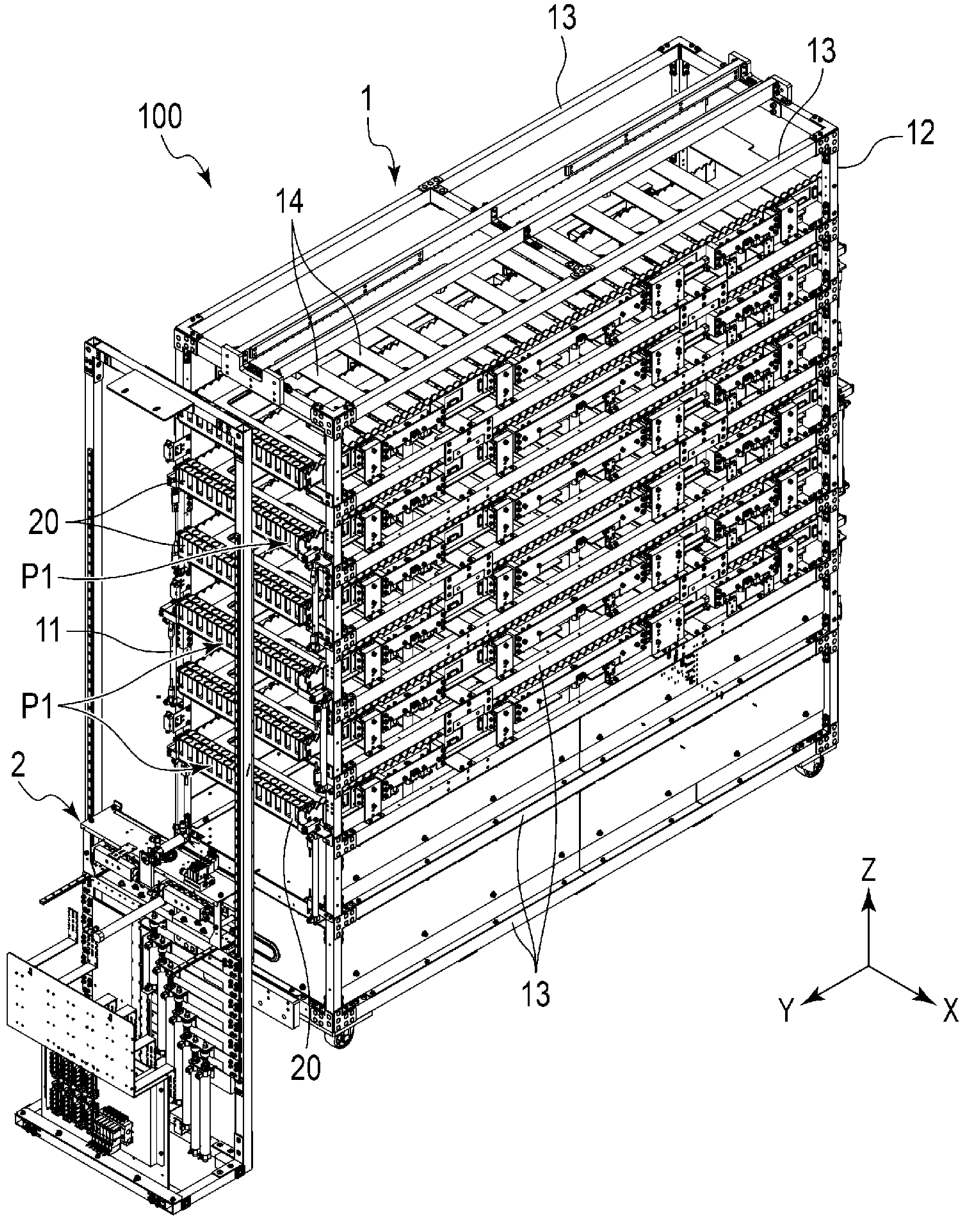
FIG. 3 is a perspective view showing a part of the storage apparatus according to the embodiment.
Figure 4:
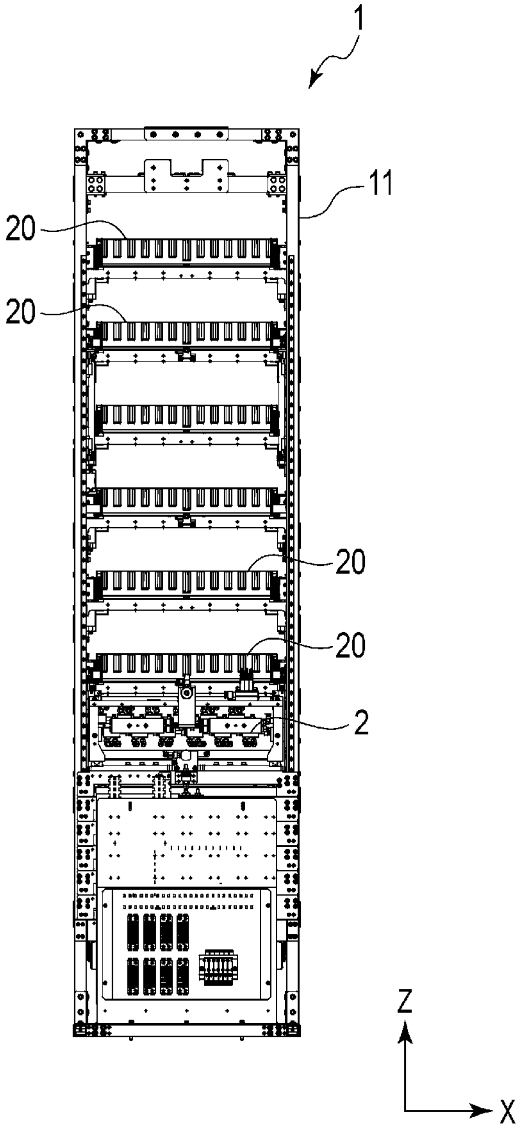
FIG. 4 is a front view of the storage apparatus according to the embodiment.
Figure 5:
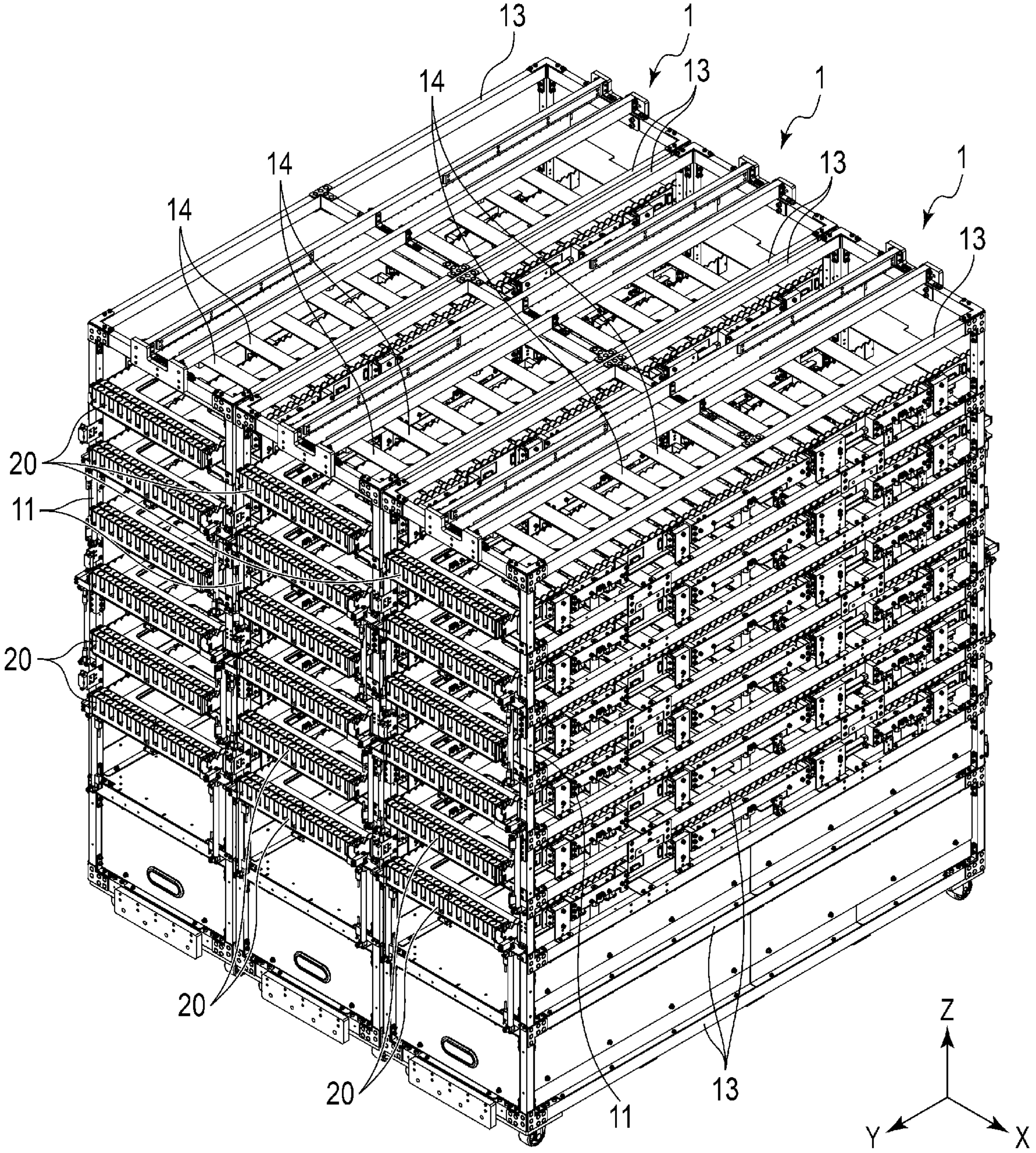
FIG. 5 is a perspective view showing a part of the storage apparatus according to the embodiment.
Figure 6:
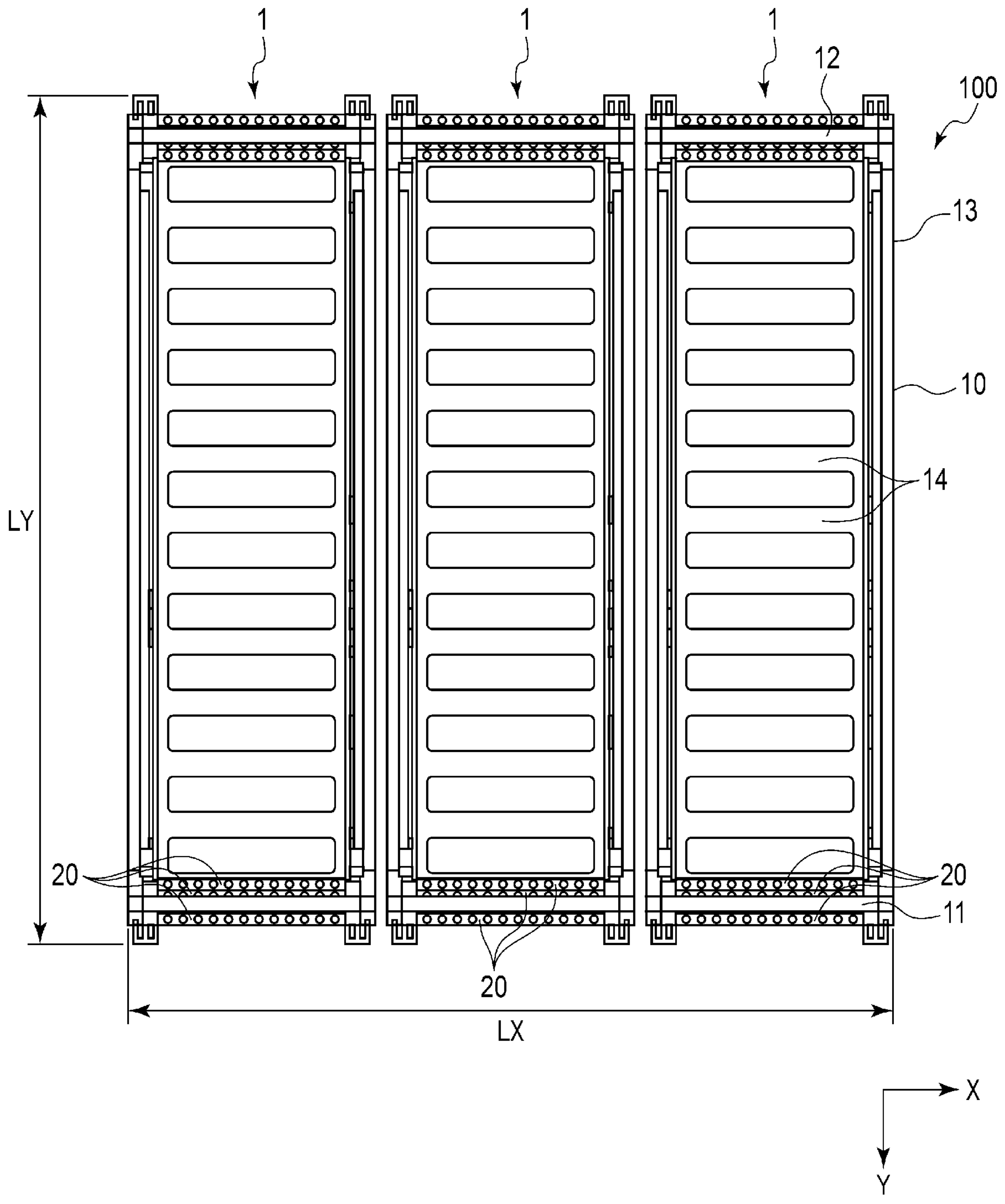
FIG. 6 is a plan view showing a part of the storage apparatus according to the embodiment.
Figure 7:
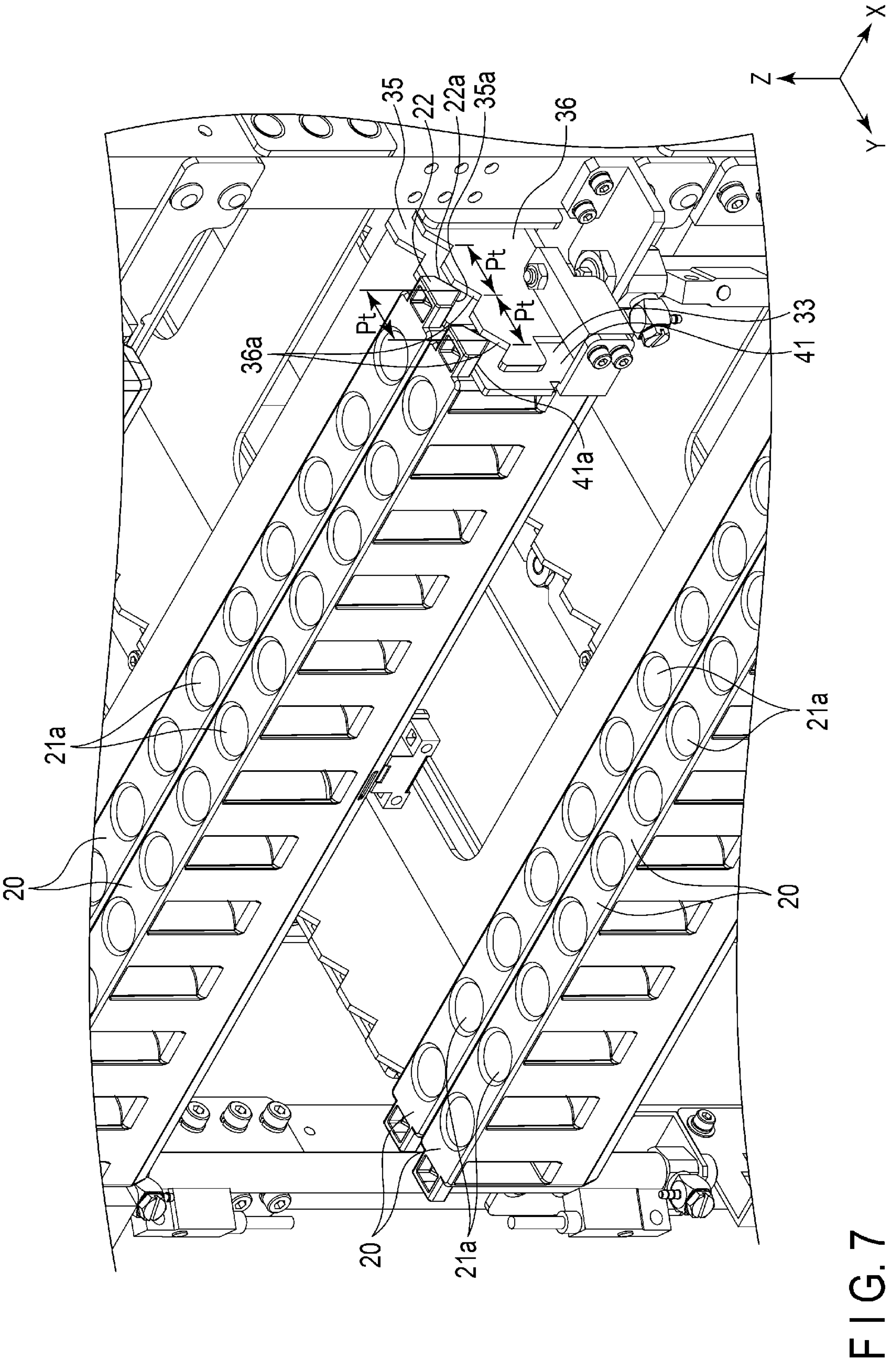
FIG. 7 is a perspective view showing a part of the storage apparatus according to the embodiment.
Figure 8:
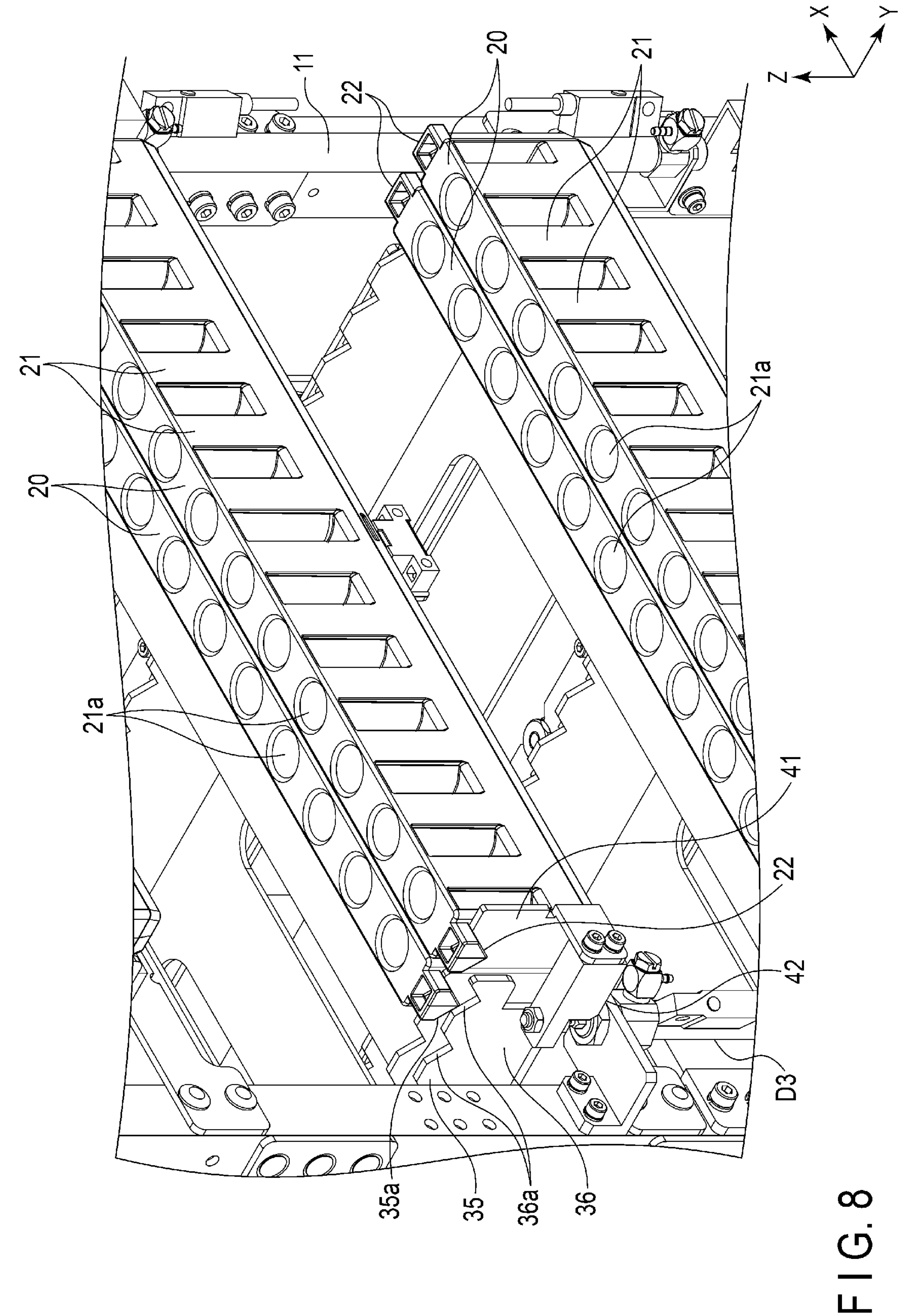
FIG. 8 is a perspective view showing a part of the storage apparatus according to the embodiment.

Hereinafter, a storage apparatus and a storage method according to an embodiment of the present invention will be described with reference to FIGS. 1 to 17. FIGS. 1 and 2 are side views of the storage apparatus. FIG. 1 shows a state of transfer, and FIG. 2 shows a state in which a transfer arm is held back. FIG. 3 is a perspective view showing a part of the storage apparatus, and FIG. 4 is a front view showing a part of the storage apparatus. FIG. 5 is a perspective view showing a storage shelf, and FIG. 6 is a plan view of the storage shelf. FIGS. 7 and 8 are perspective views each showing a part of the storage apparatus. FIGS. 9 to 17 are explanatory diagrams showing a storage method. In the drawings, X, Y, and Z denote three directions that are orthogonal to one another. An example is shown in which a width direction, a front/back direction, and a height direction of the apparatus are referred to as a "first direction" ("X direction"), a "second direction" ("Y direction"), and a "third direction" ("Z direction"). In the drawings, the components are suitably enlarged or reduced in size, or omitted for explanatory purposes.

A storage apparatus 100 includes a plurality of storage shelves 1, a plurality of transfer devices 2 functioning as a plurality of transfer units each disposed at a front part of a corresponding storage shelf 1 and configured to transfer one or more specimen containers 50 to the storage shelf 1, and a control unit 3. An example is shown in which a carry-in position P1 is provided at the front part of the storage shelf 1, and the transfer device 2 is provided at a height of a withdrawal lane 32 at the carry-in position P1.

In the present embodiment, an example is shown in which three storage shelves 1 each functioning as a storage unit and three transfer devices 2 are provided in parallel in a width direction. For example, the number of storage shelves 1 and the number of transfer devices 2 are not limited thereto, and may be suitably changed. For example, the number of storage shelves 1 and the number of transfer devices 2 may be the same or different. For example, a plurality of transfer devices 2 may be provided for a single storage shelf 1. Alternatively, a single transfer device 2 may be provided for a plurality of storage shelves 1.

The storage shelf 1 includes an exterior portion 10 and a plurality of movement units 30 each configured to supply and withdraw a plurality of racks 20 and cause them to ascend and descend. In the present embodiment, an example is shown in which three movement units 30 are provided in the height direction, which is the ascending and descending direction, in an accommodation space formed in the exterior portion 10; however, the configuration is not limited thereto.

The exterior portion 10 forms a cuboid accommodation space in which the racks 20 can be disposed in a plurality of levels, and includes an opening in each of a front surface facing the transfer device 2 and a back surface opposite thereto. For example, the storage apparatus 100 is accommodated in a housing with a plurality of storage shelves 1 disposed in parallel. The housing covers, for example, upper and lower surfaces and both side surfaces in a width direction of the storage shelves 1 arranged along the width direction, and includes an opening that allows for transfer and ascending and descending operations at least at the carry-in position P1 of a front end portion. It is to be noted that a plurality of storage shelves 1 and a plurality of transfer devices 2 may be integrally disposed in a single housing.

The exterior portion 10 includes a rectangular front frame 11 that forms a front-side opening edge, a rectangular back frame 12 that forms a back-side opening edge, and a plurality of side frames 13 extending in the front/back direction. The exterior portion 10 further includes a plurality of cross members 14 disposed at a bottom portion of each movement unit 30 below the racks 20 so as to extend in the width direction of the movement unit 30.

For example, the side frame 13 is disposed for each of a supply lane 31 and a withdrawal lane 32 provided at each movement unit 30. In the present embodiment, for example, side frames 13 are formed in six levels in total, with two levels provided for each of the three movement units 30 provided at an upper part of the storage space. The side frames 13 are provided on both sides in the width direction.

The racks 20 each configured to hold one or more specimen containers 50 are arrayed in a plurality of rows in the front/back direction in the accommodation space. In the present embodiment, the rack 20 is a container configured to hold, for example, a plurality of specimen containers 50 arranged in a single direction. The rack 20 holds specimen containers 50 in five or more columns in the first direction and two or fewer rows in the second direction; in the present embodiment, the racks 20 each configured to hold twelve specimen containers 50 in the width direction are moved row by row. The rack 20 integrally includes, for example, a rack base 21 formed of a resin material, etc., into a block shape and engaging projections 22 that function as engaging portions formed on both end surfaces of the rack base 21.

The rack base 21 includes a plurality of cylindrical accommodation holes **21*a* into which bottom portions of the specimen containers 50 are inserted. The rack base 21 includes, for example, twelve accommodation holes 21*a*** each configured to hold twelve specimen containers in each row in the X direction.

As shown in FIGS. 7 and 8, the engaging projections 22 are formed at both end portions in a longitudinal direction of the rack base 21. The engaging projections 22 project in, for example, the width direction of the apparatus, which is the longitudinal direction of the rack base 21, and are configured to engage with engaging grooves **35*a* and 36*a* of supporting plates 35 and moving plates 36 of the movement unit 30. That is, the engaging projections 22 project in the width direction orthogonal to or intersecting the front/back direction and the height direction, which are the directions of movement. Each engaging projection 22 includes, for example, a V-shaped insertion portion 22*a* projecting downward. The insertion portions 22*a* are configured to be latched by the engaging grooves 35*a* and 36*a*, which are V-shaped grooves that are open at an upper side, so as to be held by the supporting plates 35 and the moving plates 36. Each engaging projection 22 is set to have a thickness that allows the engaging projection 22 to engage with both the supporting plate 35 and the moving plate 36 in a state in which the supporting plate 35 and the moving plate 36 overlap each other. By being placed in the engaging grooves 35*a* or 36*a*, for example, the engaging projections 22 are held by the supporting plates 35 or the moving plates 36, and are thereby restricted from moving in the front/back direction. The engaging projections 22 engage with either the supporting plates 35 or the moving plates 36**, and are held thereby.

The rack 20 is switchable between, for example, a state in which the engaging projections 22 are supported in the grooves **35*a* of the supporting plates 35 and a state in which the engaging projections 22 engage with the grooves 36*a* of the moving plates 36** and is lifted.

The rack 20 advances as the moving plates 36 advance while in a state of engaging with the grooves **36*a* of the moving plates 36 and being lifted in the supply lane 31 of the movement unit 30**.

Conversely, the rack 20 retracts as the moving plates 36 retract while in a state of engaging with the engaging grooves **36*a* of the moving plates 36 and being lifted in the withdrawal lane 32**.

Each specimen container 50 is, for example, a blood collection tube formed in a tubular shape from transparent glass, etc., and has a cylindrical shape that includes therein a columnar space for accommodating a specimen such as blood serum, with an opening at an upper part. A stopper 51 is provided at the opening at the upper part. A label, for example, is bonded to an outer side surface of the specimen container 50. A barcode is indicated on the label as an information indicating unit indicating various types of information such as identification information of the specimen.

Each movement unit 30 includes a supply lane 31 functioning as a first movement section configured to sequentially advance a plurality of racks 20 in the first direction, a withdrawal lane 32 functioning as a second movement section configured to sequentially retract the racks 20 in a plurality of rows, an ascending and descending section 33 functioning as a third movement section configured to cause the racks 20 to descend at a front end, and an ascending and descending section 34 functioning as a fourth movement section configured to cause the racks 20 to ascend at a back end.

In the movement unit 30, for example, the supply lane 31 configured to advance the racks 20 and the withdrawal lane 32 configured to retract the racks 20 are disposed in two vertical levels. An example is shown in which a supply lane 31 is provided at an upper level and a withdrawal lane 32 is provided at a lower level; however, the configuration is not limited thereto, and the supply lane 31 and the withdrawal lane 32 may be reversed.

The supply lane 31 sequentially and simultaneously advances a plurality of racks 20 every predetermined pitch Pt in the accommodation space to forward them to a front opening. In the supply lane 31, for example, the racks 20 are moved every predetermined pitch Pt corresponding to a predetermined number of rows of the racks 20 in the second direction; in the present embodiment, an example is shown in which the racks 20 are sequentially moved row by row. The supply lane 31 includes a plurality of supporting plates 35 functioning as support members configured to support a plurality of racks 20, a plurality of moving plates 36 functioning as moving members configured to move the plurality of racks 20, and a driving section 37 configured to drive the moving plates 36. It is to be noted that the pitch Pt is set based on dimensions of the rack 20 in the front/back direction. As an example, the pitch Pt is set to be the same as or slightly larger than a dimension of a rack 20 in a single row in the front/back direction. At the time of supply or withdrawal, the racks 20 are sequentially moved in units of 1/10 or less of the total number of the racks 20 in the second direction, preferably in units of 1/20 or less. In the present embodiment, for example, 70 racks 20 are moved one by one, namely, the racks 20 are moved in units of 1/70 of the total number of the racks 20 in the second direction.

In the withdrawal lane 32, a plurality of racks 20 are sequentially and simultaneously retracted at every predetermined pitch and are forwarded to the back opening in the accommodation space. The supply lane 31 includes a plurality of supporting plates 35 configured to support a plurality of racks 20, a plurality of moving plates 36 configured to move the racks 20, and a driving section 37.

The supply lane 31 includes, for example, an advancement mechanism configured to sequentially advance the racks 20 in the front/back direction, and the withdrawal unit includes a retraction mechanism configured to sequentially retract the racks 20. It is to be noted that the direction of movement in the withdrawal unit is opposite the direction of movement in the supply unit; however, the other configurations are the same and therefore the common symbols will be assigned.

Each of the supporting plates 35 extends in the front/back direction, and supports a plurality of racks 20. For example, each supporting plate 35 includes both main surfaces extending along the front/back direction and the up/down direction, and is formed in a plate shape with a thickness extending along the width direction, and is supported by the side frames 13. The supporting plates 35 are provided on both sides in the width direction in each of the supply lane 31 and the withdrawal lane 32 of each movement unit 30. That is, as an example, in the present embodiment, in each of three movement units 30, a plurality of supporting plates 35 are provided in the front/back direction on both right and left sides of each of the supply lane 31 and the withdrawal lane 32 disposed in two vertical levels.

Each supporting plate 35 includes a plurality of engaging grooves 35*a* that are engageable with the engaging projections 22 at both ends of the rack 20. The supporting plate 35 is a plate-shaped member extending in the front/back direction and including a plurality of V-shaped valleys at an upper edge. For example, the upper edge of the supporting plate 35 is formed in a corrugated shape with ridges and valleys disposed in an alternating manner, and includes a plurality of engaging grooves 35*a* arranged at a predetermined pitch Pt in the front/back direction. The supporting plates 35 are, with the engaging projections 22 of the rack 20 disposed in the engaging grooves 35*a*, capable of holding the rack 20. Also, the supporting plates 35 can be disengaged from the rack 20 by being moved below the rack 20 or the rack 20 being lifted upward.

The moving plates 36 extend in the front/back direction, and support a plurality of racks 20. The moving plates 36 extend in the front/back direction, and are movably supported relative to the side frames 13. Each moving plate 36 includes both main surfaces extending along the front/back direction and the up/down direction, and is formed in a plate shape with a thickness extending along the width direction. The moving plates 36 are, for example, allowed by the driving section 37 to move along a predetermined traveling route by making a front/back operation and an ascending and descending operation. The moving plates 36 are provided on both sides in the width direction of the supply lane 31 and the withdrawal lane 32 of each movement unit 30. That is, as an example, in the present embodiment, in each of three movement units 30, a plurality of moving plates 36 are provided in the front/back direction on both right and left sides of the supply lane 31 and the withdrawal lane 32 disposed in two vertical levels.

Each moving plate 36 includes a plurality of engaging grooves 36*a* that are engageable with the engaging projections 22 at both ends of the rack 20. Each moving plate 36 is a plate-shaped member extending in the front/back direction and including a plurality of V-shaped valleys formed in parallel at an upper edge. For example, the upper edge of the moving plate 36 is formed in a corrugated shape with ridges and valleys disposed in an alternating manner, and includes a plurality of engaging grooves 36*a* arranged at a predetermined pitch Pt in the front/back direction. The moving plates 36 are, with the engaging projections 22 of the rack 20 disposed in the engaging grooves 36*a*, capable of holding the rack 20. Also, the moving plates 36 can be disengaged from the rack 20 by being moved below the rack 20 or the rack 20 being lifted upward.

The engaging grooves 36*a* of the moving plate 36 are formed in the same shape at the same pitch Pt as the engaging grooves 35*a* of the supporting plate 35. That is, the moving plate 36 and the supporting plate 35 are configured in such a manner that their engaging grooves 35*a* and 36*a* overlap one another. Also, a front end portion of the moving plate 36 is, in an advancing state, disposed at a position projecting forward of a front end portion of the supporting plate 35, and the engaging grooves 36*a* are disposed at a position overlapping an engaging groove 41*a* of an ascending and descending plate 41 provided forward of the supporting plate 35. That is, the moving plate 36 is, in the advancing state, disposed outside of both the supporting plate 35 and the ascending and descending plate 41 arranged side by side in the front/back direction so as to face both of them. The front end portion of the moving plate 36 is, in a retracted state, set at a position which overlaps the engaging groove 35*a* at a front end portion of the supporting plate 35 and at which the engaging groove 36*a* of the front end portion is disposed.

The moving plate 36 is, in the width direction, disposed outside of the supporting plate 35 and the ascending and descending plate 41, which is disposed side by side with and forward of the supporting plate 35, so as to overlap the supporting plate 35 and the ascending and descending plate 41. The moving plate 36 is, for example, disposed so as to overlap the supporting plate 35 and the ascending and descending plate 41 at a predetermined interval in the width direction.

It is to be noted that, as an example, all the racks 20 arrayed over the entire length in the front/back direction may be supported by a single supporting plate 35 and a single moving plate 36, and an ascending and descending plate 41 at a front end portion. Alternatively, the racks 20 may be divided into a plurality of groups in the front/back direction, in such a manner that each group of racks 20 in the front/back direction are supported by a supporting plate 35, a moving plate 36, and an ascending and descending plate 41 at the front end portion.

The driving section 37 includes a plurality of air cylinders D1 as a first driving source and a plurality of air cylinders D2 as a second driving source, and is configured to support the moving plates 36 relative to the side frames 13 so as to be movable in two directions. Each air cylinder D1 includes, for example, a shaft extending along the height direction, and is configured to move the moving plates 36 back and forth in the height direction. Each air cylinder D2 includes a shaft extending along the front/back direction, and is configured to move the moving plates 36 back and forth in the second direction. The driving section 37 drives the air cylinders D1 and D2 at a predetermined timing under the control of the control unit, thereby moving the moving plates 36 forward and backward and upward and downward to repeat a traveling movement of, for example, a set of ascending, advancing, descending, and retracting. The rack 20 is lifted at the time of ascending, and is disengaged at the time of descending. The moving plates 36 are advanced by one pitch Pt with the rack 20 lifted and held, and thereby the racks 20 are advanced row by row.

In the supply lane 31, in a state in which the engaging projections 22 of the racks 20 are set in the engaging grooves 35*a* of the supporting plates 35, the moving plates 36 repeatedly perform a circulating operation of: allowing the engaging projections 22 of the racks 20 to engage with the engaging grooves 36*a* of the moving plates 36 so as to move upward and lift the racks 20, thereby disengaging the racks 20 from the supporting plates 35; moving forward to advance the racks 20; moving downward to set the racks 20 at the engaging projections 22 of the supporting plates 35; retracting from the engaging projections 22 to retract and disengage the engaging projections 22 from the engaging grooves 36*a* of the moving plates 36; and retracting to revert to an original position, thereby sequentially advancing the racks 20.

In the withdrawal lane 32, in a state in which the engaging projections 22 of the racks 20 are set in the engaging grooves 35*a* of the supporting plates 35, the moving plates 36 repeatedly perform a circulating operation of: allowing the engaging projections 22 of the racks 20 to engage with the engaging grooves 36*a* of the moving plates 36 so as to move upward and lift the racks 20, thereby disengaging the racks 20 from the supporting plates 35; moving backward to retract the racks 20; moving downward to set the racks 20 at the engaging projections 22 of the supporting plates 35; retracting from the engaging projections 22 to retract and disengage the engaging projections 22 from the engaging grooves 36*a* of the moving plates 36; and advancing to revert to an original position, thereby sequentially retracting the racks 20.

At the time of supply or withdrawal, the storage apparatus 100 simultaneously moves the specimen containers 50 in units of, for example, five or more columns in the first direction and one or two rows in the second direction. As an example, in the present embodiment, the specimen containers 50 are simultaneously moved by one pitch Pt in units of one row in the second direction and 12 columns in the first direction.

Each of the ascending and descending sections 33 and 34 includes an ascending and descending plate 41 disposed adjacent to a front/back end portion of the supporting plate 35, and an ascending and descending driving portion 42 configured to move the ascending and descending plate 41 to ascend and descend along the third direction, and moves the racks 20 to ascend and descend.

The ascending and descending section 33 provided at the front part, for example, causes a rack 20 located at a front part of the supply lane 31, namely, at a downstream side in the supply lane 31 to descend, thereby moving the rack 20 to a front part of the withdrawal lane 32, namely, to an upstream side in the withdrawal lane 32.

Similarly, the ascending and descending section 34 provided at the back part causes the rack 20 located at a back part of the withdrawal lane 32, namely, at a downstream side in the withdrawal lane 32 to ascend, thereby moving the rack 20 to a back part of the supply lane 31, namely, to an upstream side in the supply lane 31.

The ascending and descending plates 41, each of which is a plate member disposed side by side with the front/back end portion of the supporting plate 35, are arrayed along the front/back direction. The ascending and descending plate 41 includes, at an upper end edge, a single engaging groove 41*a* having the same shape as the supporting plate 35 and the moving plate 36. The ascending and descending plate 41 is disposed side by side with the supporting plate 35 in the front/back direction. The engaging grooves 35*a* at the foremost part of the supporting plate 35 and the engaging grooves 41*a* of the ascending and descending plate 41 are arranged at the same pitch Pt as the pitch of the plates 35 and 36. The ascending and descending plate 41 is configured to ascend and descend by the ascending and descending driving portion 42.

The ascending and descending driving portion 42 includes, for example, an air cylinder D3 including an ascending and descending axis extending along the height direction. The ascending and descending driving portion 42 moves the ascending and descending plate 41 in the up/down direction at a predetermined timing, thereby passing the rack 20 held in the ascending and descending plate 41 from the supply lane 31 to the withdrawal lane 32, or from the withdrawal lane 32 to the supply lane 31.

The transfer device 2 includes a plurality of transfer arms 201 configured to grasp specimen containers 50 waiting at or to be conveyed at a transfer source, and insert them into the rack 20 in a front row, which is a transfer position, and an arm driving device 202 configured to operate the transfer arms 201 at a predetermined timing. The transfer device 2 simultaneously grasps a plurality of specimen containers 50 on, for example, a conveyor mechanism 61 provided in a separate processing device 60 disposed adjacent thereto by the number of specimen containers 50 to be inserted into the racks 20 to be simultaneously moved, and conveys them to the rack 20 in the front row of each movement unit 30. That is, in the present embodiment, a predetermined number of specimen containers 50 to be stored in a single rack 20 are simultaneously held, and are transferred to the rack 20. For example, the specimen containers 50 descend from the front row in the supply lane 31, and are sequentially inserted into the accommodation holes 21*a* of the rack base 21 at a timing before they are withdrawn to the withdrawal lane 32. It is to be noted that the transfer source may be a conveyance line such as the conveyor mechanism 61 of the processing device 60 of various types, or may be various racks in a standby state.

The control unit 3 includes a processor configured to control the operation of each component based on various types of data and calculation and determination results. Specifically, the control unit 3 moves the racks 20 by operating mechanisms such as driving portions 37 and 42 of the movement unit 30 at a predetermined timing.

For example, the control unit 3 drives a plurality of air cylinders D1 and D2 of a plurality of movement units 30, thereby causing the moving plates 36 to advance, descend, retract, and ascend. That is, by combining the up/down motion and the front/back motion, the advancement, the descending, the retraction, and the ascending are repeated, and the moving plates 36 are repeatedly moved along a predetermined traveling path. A stroke of the advancement and the retraction is one pitch Pt, and a stroke of the ascending and descending motion, namely, a stroke of the up/down motion of the moving plates 36 is set to, for example, a predetermined distance that is larger than depths of the engaging grooves 35*a*, 36*a*, and 41*a* and allows for engagement and disengagement.

Also, the control unit 3 drives the air cylinder D3 of the ascending and descending section 34 at a predetermined timing, thereby moving the ascending and descending plate 41 to ascend and descend. The stroke of the ascending and descending operation is a distance between the upper-level and lower-level lanes 31 and 32.

Also, by driving the transfer device 2 at a predetermined timing, the control unit 3 grasps the specimen containers 50 at the transfer source, and performs a carry-in process of carrying the specimen containers 50 to the rack 20 in the front row of each movement unit 30.

Next, a storage method using the storage shelf 1 according to the present embodiment will be described with reference to FIGS. 9 to 17.

As an example, a process of sequentially inserting specimen containers 50 into a rack 20 at a front part of the lower-level withdrawal lane 32 of the front end portion, while sequentially circulating vacant racks 20 into which specimen containers 50 are not inserted in the upper-level supply lane 31 and the withdrawal lane 32 of each movement unit 30, is performed.

The storage method according to the present embodiment includes: a supplying step (ST1) of sequentially supplying vacant racks 20 to a front row; a descending step (ST2) of causing the ascending and descending section to descend a rack 20 in the front row; a transfer step (ST3) of causing the transfer device 2 to transfer specimen containers 50 before retraction in the withdrawal lane 32; a withdrawal step (ST4) of sequentially retracting the racks 20 in the withdrawal lane 32 after the transfer; and an ascending step (ST5) of causing the racks 20 to ascend from the lower-level withdrawal lane 32 toward the upper-level supply lane 31. Furthermore, the control unit further performs, at a predetermined timing: a restoring step (ST6) of causing the ascending and descending plate 41, which has been made vacant by the retracting process at the withdrawal step after the descending at ST2 at a forward part, to ascend and revert to the upper-level supply lane 31; and a restoring step (ST7) of causing the ascending and descending plate 41, which has been made vacant by the advancement process at the supplying step after the ascending at ST5 at a backward part, to descend and revert to the lower-level withdrawal lane 32. For example, by performing, in parallel, an advancement process in the upper-level supply lane 31, an ascending and descending process in the front-side ascending and descending section 33, a retracting process in the lower-level withdrawal lane 32, and an ascending and descending process in the back-side ascending and descending section 34, the racks 20 are sequentially moved row by row along a traveling route consisting of advancing, descending, retracting, and ascending. At the transfer position set in the traveling route, by sequentially performing, in parallel, a transfer process of carrying in separately waiting specimen containers 50 row by row, a process of storing a large number of specimen containers 50 can be performed at a high speed. It is to be noted that, in the present embodiment, an example has been shown in which the racks 20 are processed row by row; however, the configuration is not limited thereto. For example, two rows of racks 20 may be simultaneously moved along a traveling route, in such a manner that specimen containers 50 are simultaneously inserted into two rows of insertion holes. An example has been described in which twelve specimen containers 50 are held in a single row; however, the configuration is not limited thereto.

In the supplying step ST1, an advancement process of advancing, by one pitch, a plurality of racks 20 arranged in the front/back direction in a batch is performed in the supply lane 31.

Specifically, in a state in which a plurality of racks 20 engage with the engaging grooves 35*a* and 36*a* of the supporting plates 35 and the moving plates 36 and are held thereby, the air cylinders D2 are driven to cause only the moving plates 36 to ascend, thereby causing all the upper-level racks 20 to ascend with the moving plates 36. Through the lifting, the engagement of the supporting plates 35 is released.

Thereafter, the air cylinders D1 are driven to advance the moving plates 36 by one pitch, while the rack 20 is lifted and held by the moving plates 36.

Figure 9:
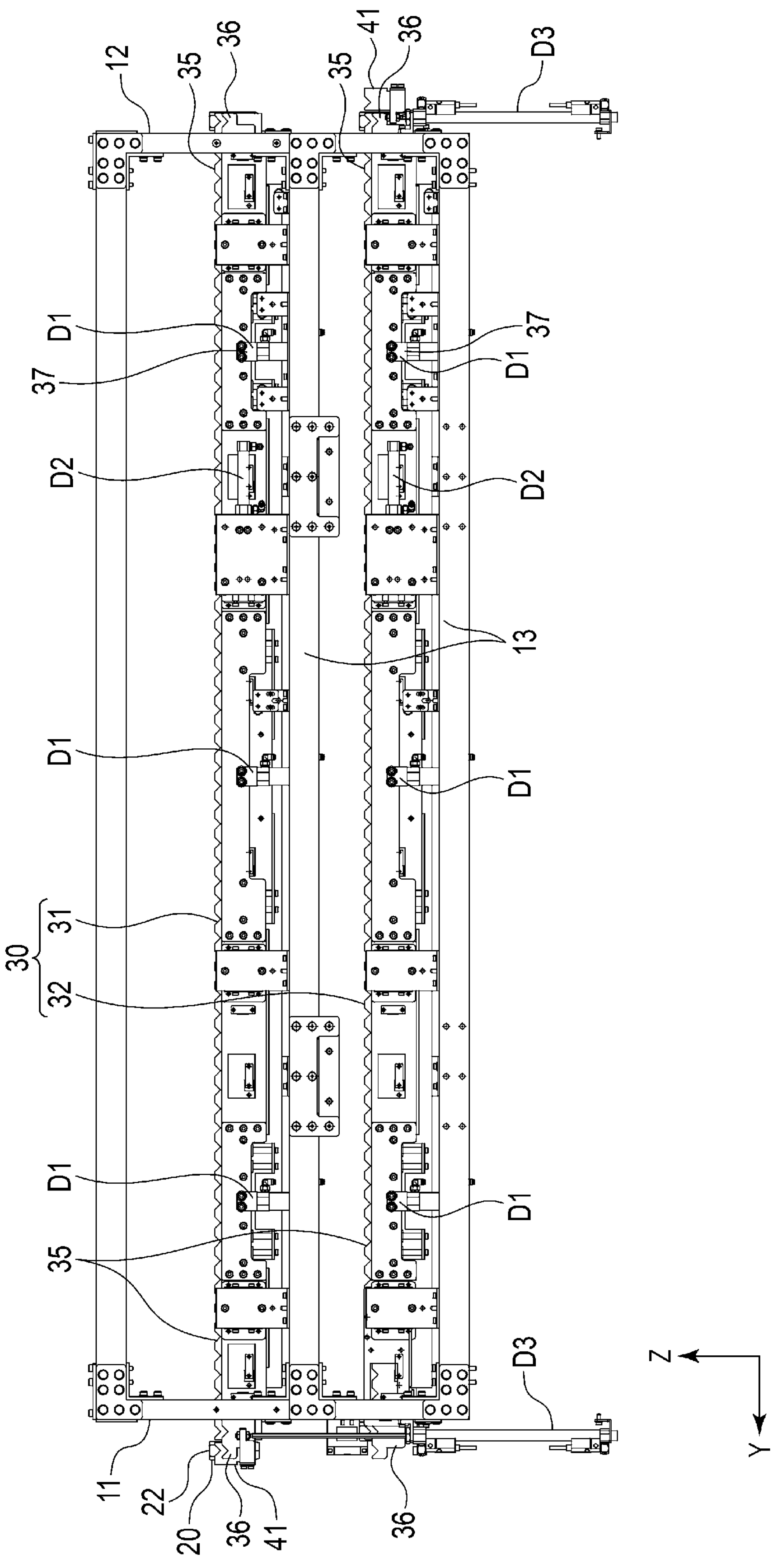
FIG. 9 is an explanatory view showing a storage method according to the embodiment.
Figure 10:
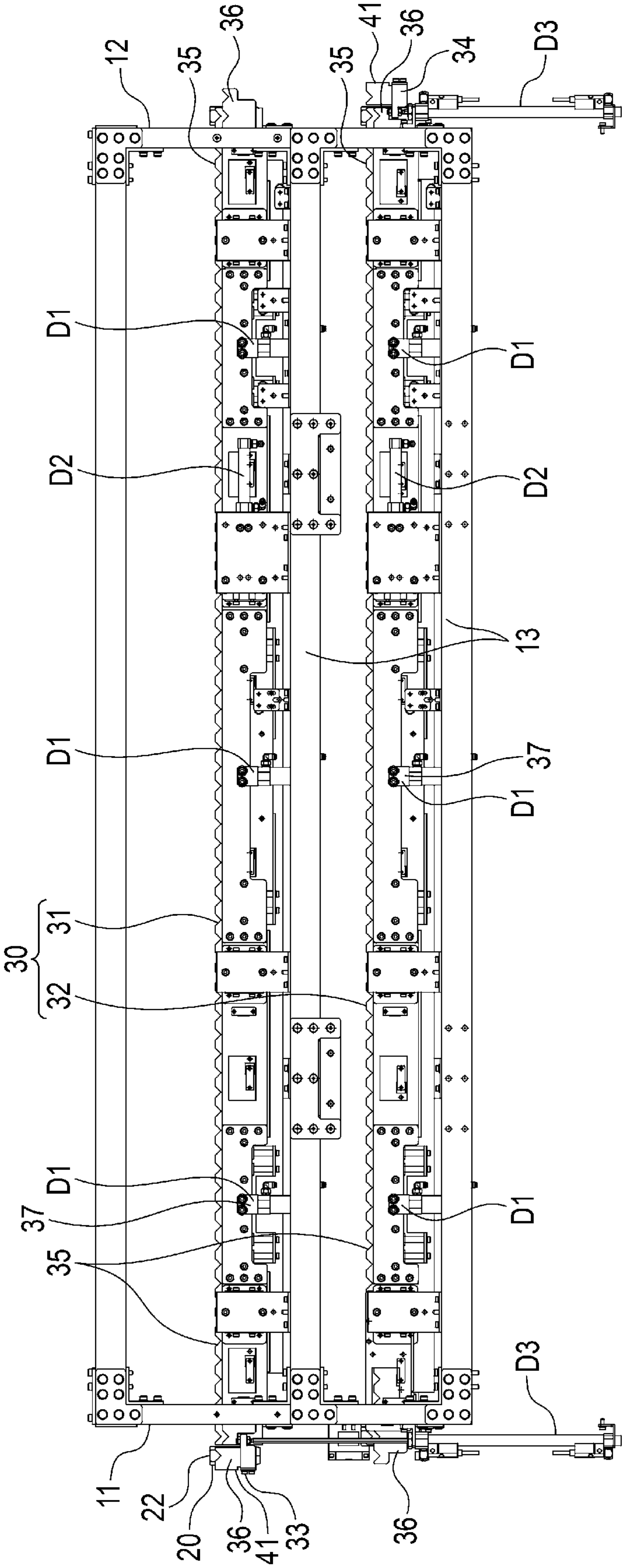
FIG. 10 is an explanatory view showing a storage method according to the embodiment.

Moreover, by driving the air cylinders D2 to cause the moving plates 36 to descend, the engaging projections 22 are disposed at the engaging grooves 35*a* and 41*a* one pitch before. Thereby, the racks 20 can be advanced. At this time, the engaging projections 22 of the rack 20 located at the engaging groove 35*a* at the foremost part of the supporting plate 35 is set in the engaging groove 41*a* of the ascending and descending plate 41 disposed at the front of the supporting plate 35, as shown in FIG. 9. Also, as shown in FIG. 10, by retracting the moving plates 36, preparation is made for an advancement process of the subsequent rack 20 in the back row.

Figure 11:
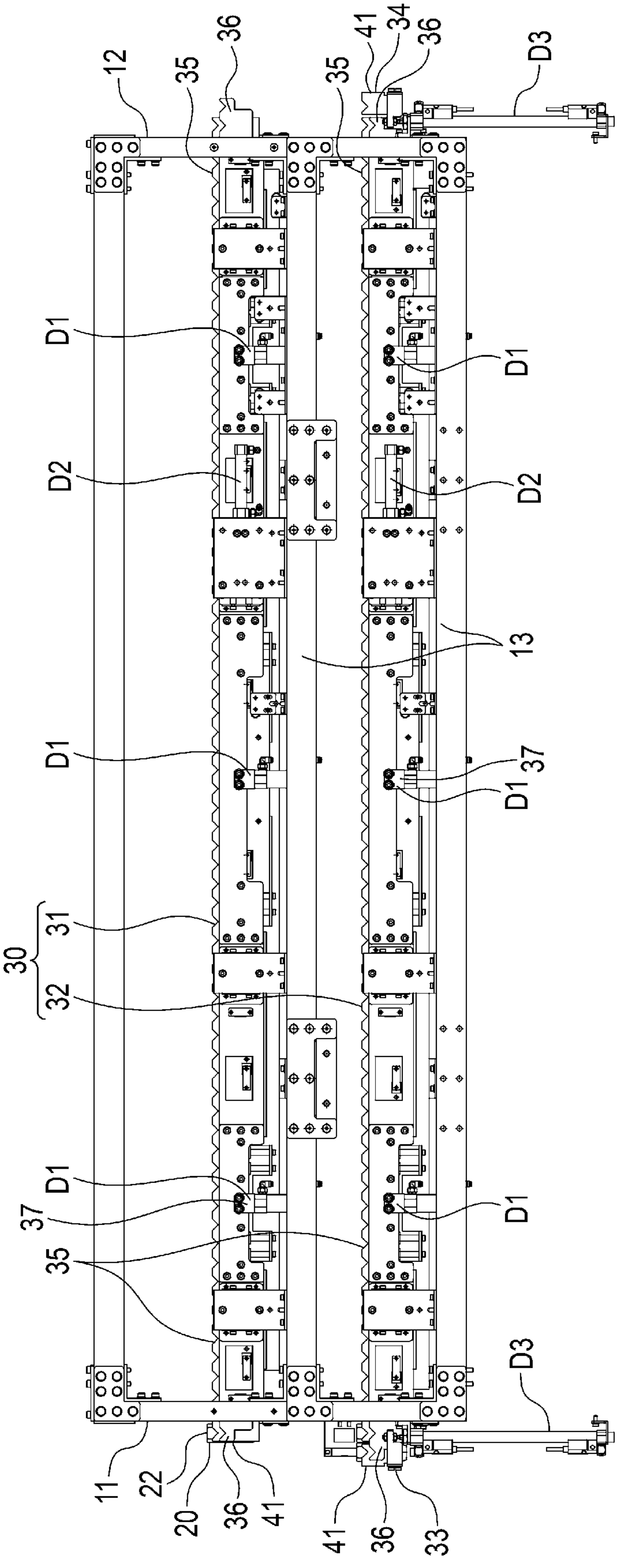
FIG. 11 is an explanatory view showing a storage method according to the embodiment.

At the descending step ST2, the rack 20 in the front row is caused to descend by the ascending and descending section 33 at the front. Specifically, the air cylinders D3 of the ascending and descending section 33 are driven, causing the ascending and descending plate 41 to descend. Thereby, as shown in FIG. 11, the rack 20 supported by the ascending and descending plate 41 moves to the height of the withdrawal lane 32.

At the transfer step ST3, at the same timing as completion of the descending by the ascending and descending section 33, the specimen containers 50 are inserted one by one or in a batch into the rack 20 at the front row located on an upstream side in the withdrawal lane 32 by the transfer device 2, as shown in FIG. 1. For example, after a vacant rack 20 that has been caused to descend by the ascending and descending plate 41 arrives at the specimen transfer position, a plurality of, for example, up to twelve specimen containers 50 are simultaneously transferred to the rack 20 from a conveyor mechanism 61, etc., which is a standby location, with a dedicated chuck.

Figure 12:
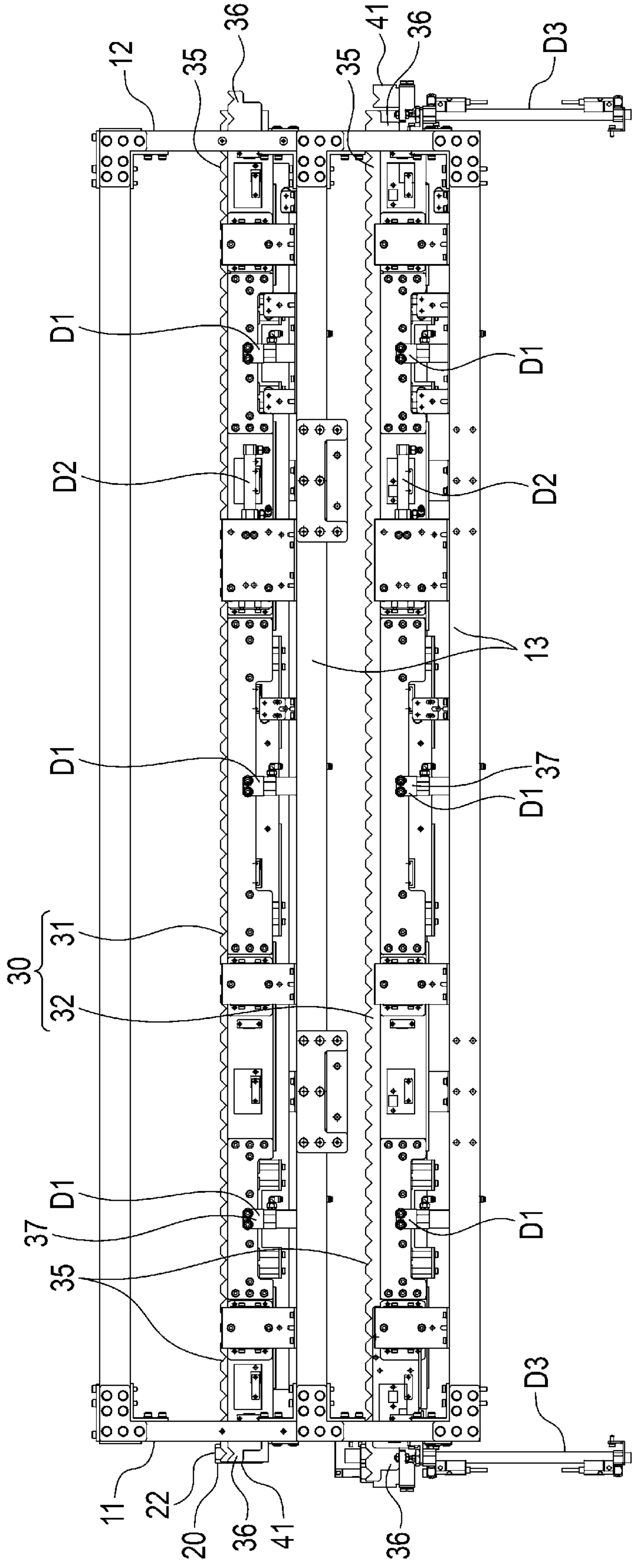
FIG. 12 is an explanatory view showing a storage method according to the embodiment.

At the withdrawal step ST4, the racks 20 in the withdrawal lane 32 are retracted in a batch. Specifically, in a state in which the racks 20 engage with the engaging grooves 41*a*, 35*a*, and 36*a* of the ascending and descending plate 41, the supporting plates 35, and the moving plates 36 and are held thereby, the moving plates 36 in the withdrawal lane 32 are caused to ascend, as shown in FIG. 12. By driving the air cylinders D1 in the withdrawal lane 32, for example, the moving plates 36 are caused to ascend, and up to 71 racks 20 can be simultaneously lifted. Thereby, the racks 20 ascend, and are disengaged from the supporting plates 35 and the ascending and descending plate 41.

Figure 13:
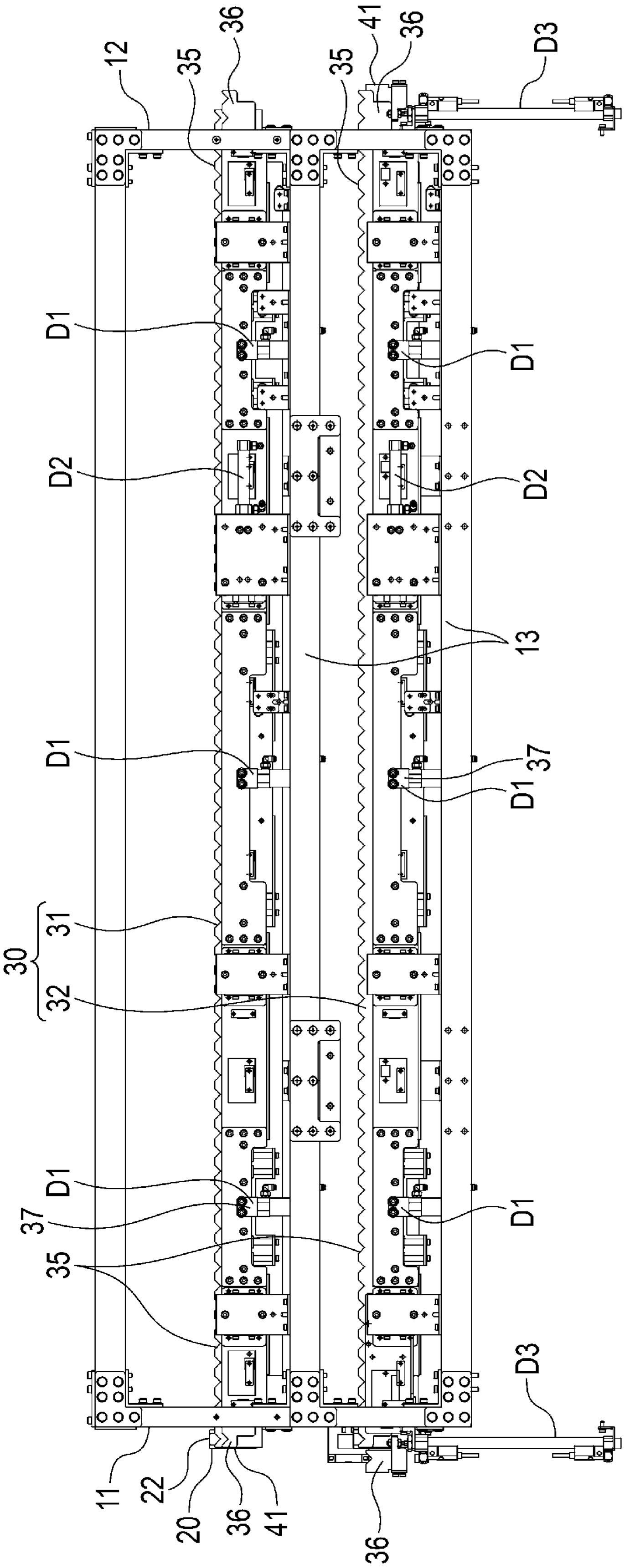
FIG. 13 is an explanatory view showing a storage method according to the embodiment.

Furthermore, as shown in FIG. 13, by driving the air cylinders D2 while lifting and holding the racks 20, the moving plates 36 are moved backward by one pitch, causing all the racks 20 to retract by a single row.

Figure 14:
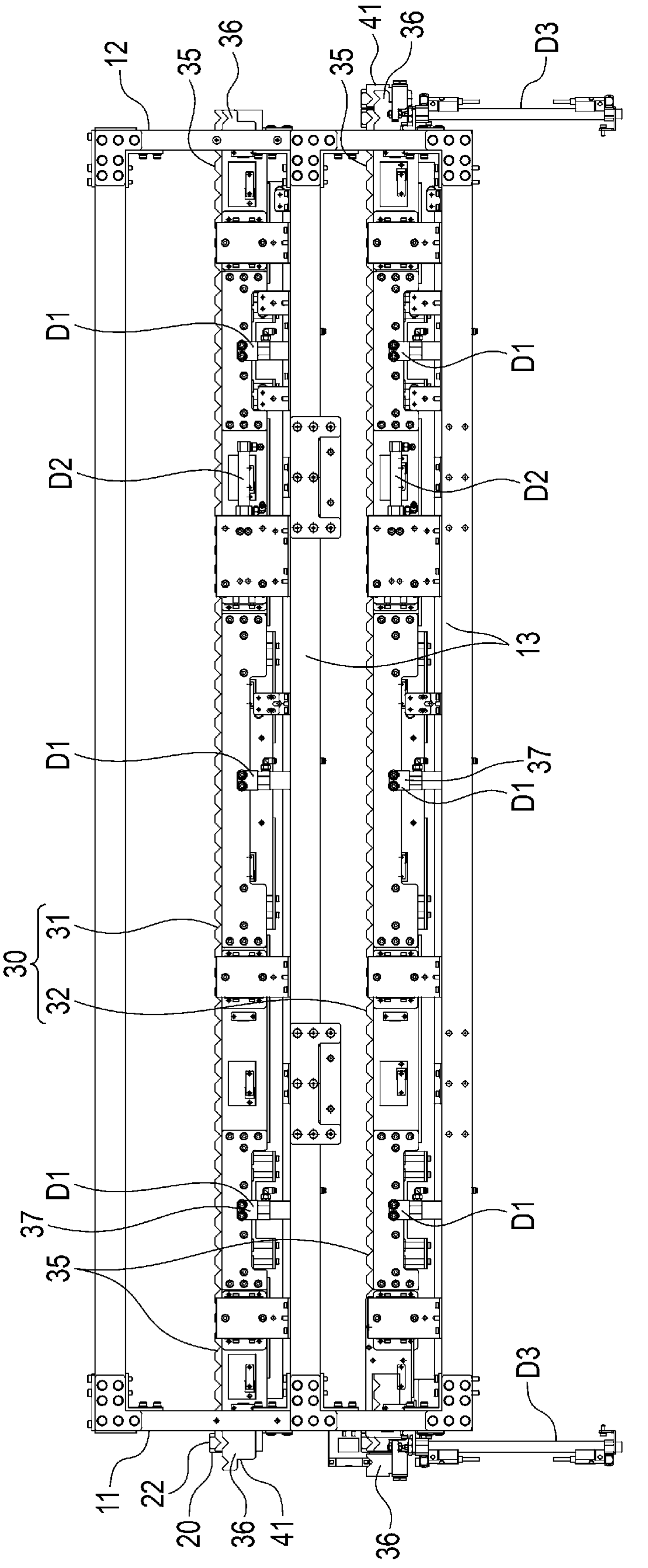
FIG. 14 is an explanatory view showing a storage method according to the embodiment.

Thereafter, as shown in FIG. 14, by causing the moving plates 36 to descend with the air cylinders D1 with the air cylinders D2 stopped after the operation, the engaging projections 22 are disposed in the engaging grooves 35*a* located one pitch Pt behind. Thereby, a plurality of racks 20 can be retracted. At this time, the rack 20 held by the ascending and descending plate 41 immediately after the carry-in at the front row in the withdrawal lane 32 is retracted by one pitch Pt, and is thereby set in the engaging groove 35*a* at the first row of the subsequent supporting plate 35, and the engaging groove 41*a* of the ascending and descending plate 41 is made vacant. By repeating the above-described operation, a dedicated rack moves to the right end.

Figure 15:
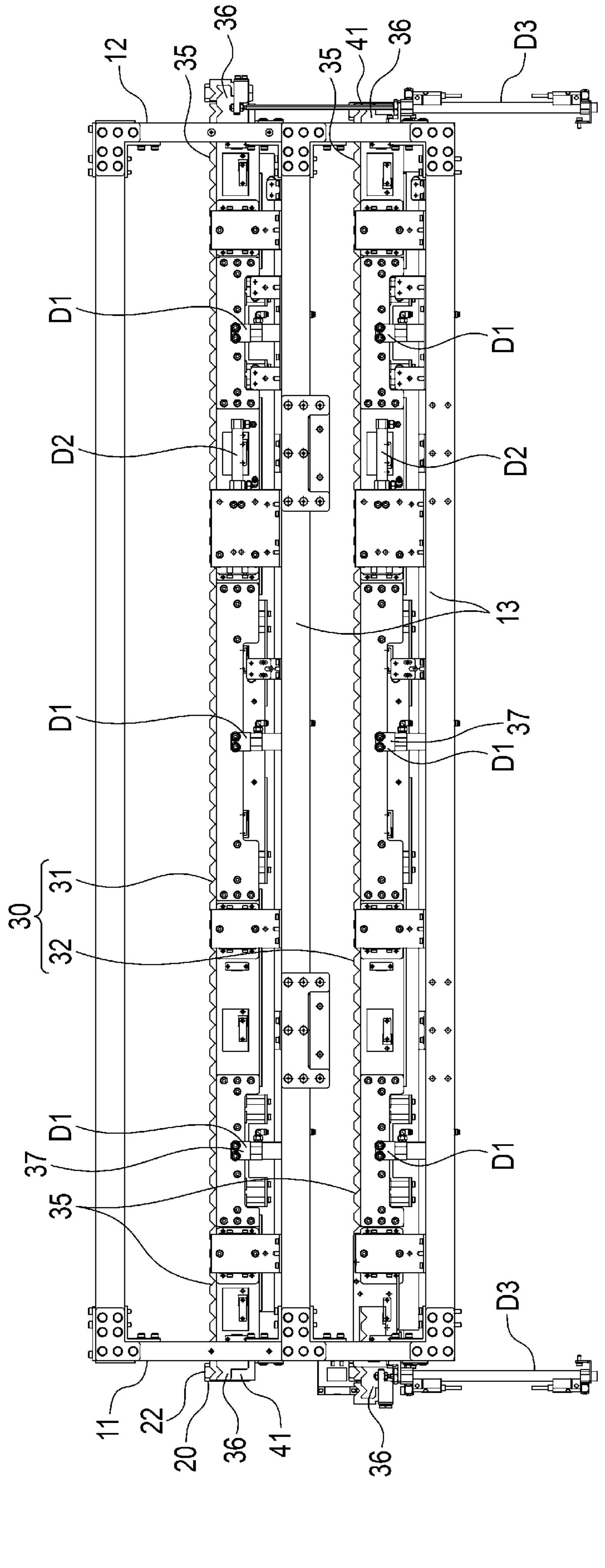
FIG. 15 is an explanatory view showing a storage method according to the embodiment.

Furthermore, at the restoring step ST6, the control unit causes the ascending and descending plate 41 at the front end portion that has been made vacant to ascend, as shown in FIG. 15.

At the ascending step ST5, the ascending and descending section 34 at the back causes the rack 20 at the end of the row to ascend. Specifically, the air cylinder D3 of the ascending and descending section 34 is driven, causing the ascending and descending plate 41 to ascend. Thereby, the rack 20 supported by the ascending and descending plate 41 moves to the height of the supply lane 31.

Figure 16:
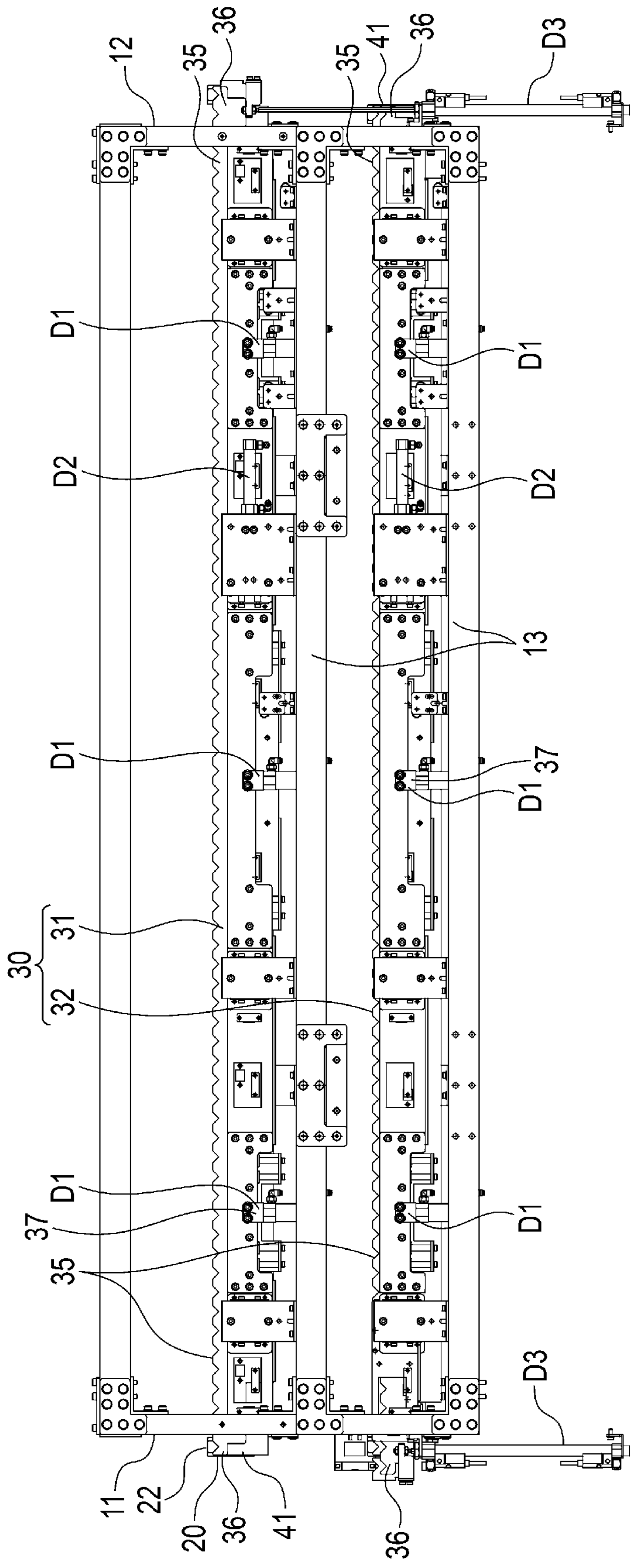
FIG. 16 is an explanatory view showing a storage method according to the embodiment.
Figure 17:
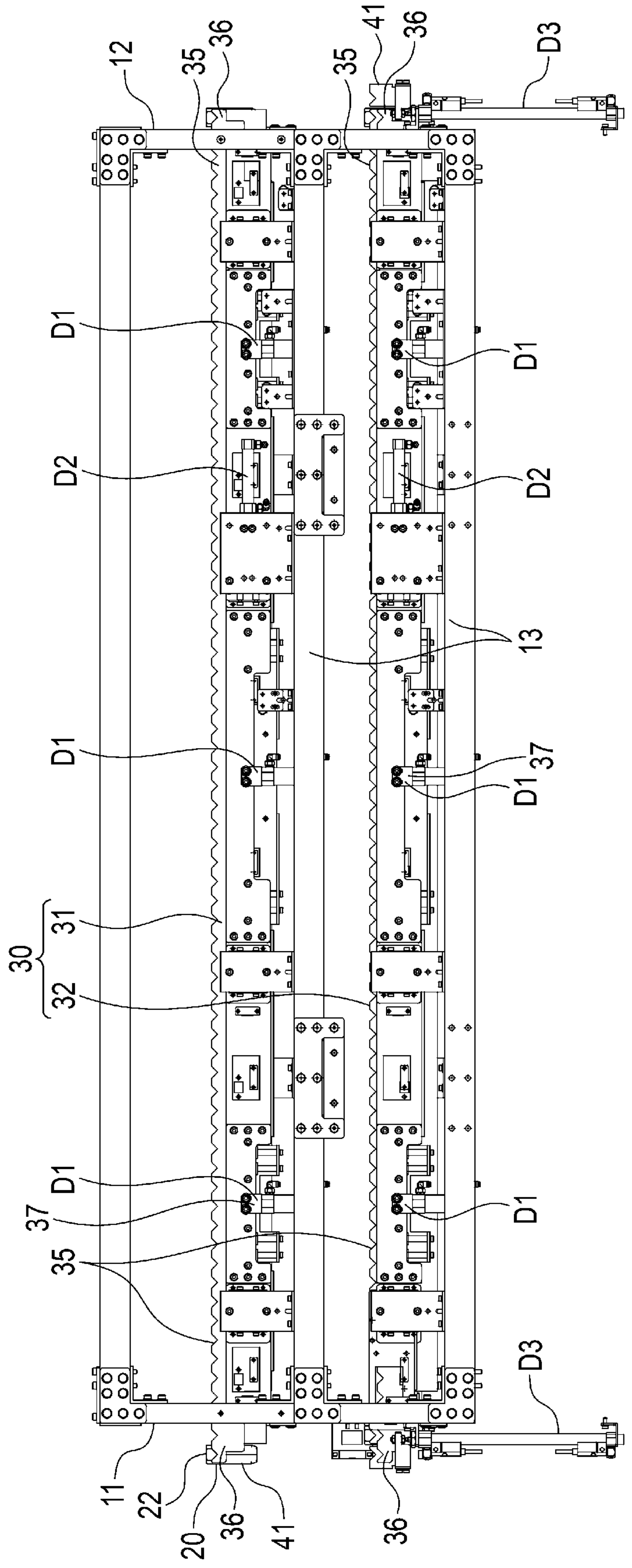
FIG. 17 is an explanatory view showing a storage method according to the embodiment.

The racks 20 with the specimen containers 50 caused to ascend at the ascending step ST5 are advanced row by row at the supplying step ST1, as shown in FIGS. 16 and 17.

Through the above-described process, the racks 20 are sequentially moved row by row along a circulation route configured of the supply lane 31, the front-side ascending and descending section 33, the withdrawal lane 32, and the back-side ascending and descending section 34. It is to be noted that the process of advancing, descending, retracting, and ascending is performed in parallel, and the racks 20 are sequentially supplied, caused to descend, withdrawn, and caused to ascend one by one in order at a predetermined processing pitch. That is, at a timing when a rack 20 at a predetermined row is forwarded to the front row and caused to descend, a rack 20 at a subsequent row is forwarded to the front row. At this time, a carry-in process is sequentially performed in the transfer device 2 in parallel, in such a manner that the specimen containers are carried in at the same time as the descending.

Specifically, in the supply lane 31, a supplying step of moving a rack 20 from the back to the front; an ascending and descending step of causing the ascending and descending section 33 to move the rack 20 in the up/down direction; a carry-in process of causing the transfer device 2 to transfer a plurality of specimen containers in the width direction stored in the rack 20 at the carry-in position of the front end portion; and a retracting process of causing the withdrawal lane 32 to move the transferred rack to the back are performed in parallel. Furthermore, the ascending and descending step of causing the ascending and descending section 33 to move the rack 20 in the up direction is also performed in parallel.

By repeating the supplying, the descending, the carrying in, the withdrawing, and the ascending a predetermined number of times, specimen containers 50 are sequentially transferred to the vacant racks 20 row by row, and the racks 20 to which the specimen containers 50 have been transferred are retracted, thereby withdrawing the racks 20 into the storage shelf 1 again. By allowing the racks 20 to travel around the circulation route inside the storage shelf 1, the specimen containers 50 can be transferred to all the racks 20 in the supply lane 31 and the withdrawal lane 32 and stored therein.

The storage apparatus is configured in such a manner, for example, that 70 racks 20 can be stored in the front/back direction on each floor, with each rack 20 storing 12 specimen containers 50, thus storing 840 specimen containers 50 on each floor of a single storage shelf. With the six-level structure, the storage apparatus is configured to store 5040 specimen containers 50.

In the storage shelf 1 with the above-described configuration, the racks can be moved inside the storage shelf 1, thereby allowing a large number of specimen containers 50 to be stored in the minimum space. That is, by moving the racks 20 row by row, the transfer arms 201 of the transfer device 2 need not be disposed on each floor. It is thereby possible to simplify the configuration of the transfer device 2, and eliminate the need for the space for allowing the transfer arms 201 to move and the space for taking in and out the specimen containers. That is, by sequentially allowing the racks to move to a transfer location and to move along a circulation route passing through the transfer location, and installing the specimen containers into the racks only at the front surface of the storage shelf, the space for allowing the transfer device to move above the racks can be eliminated. It is thereby possible to minimize a gap between the floors, thus allowing a large number of floors to be stacked. By vertically stacking a plurality of rack storage shelves each including a set of a supply-side level and a withdrawal-side level, it is possible to increase the number of specimen containers to be installed without increasing the floor area, thus greatly improving the efficiency of storing specimen containers. It is to be noted that, in three movement units 30 with six-floor lanes, for example, a space formed between the floors, namely, a height dimension from an upper end of a lower-level specimen container 50 to a bottom surface of a lane located at one level above can be, for example, equal to or smaller than a height dimension of the specimen container 50.

Figure 18:
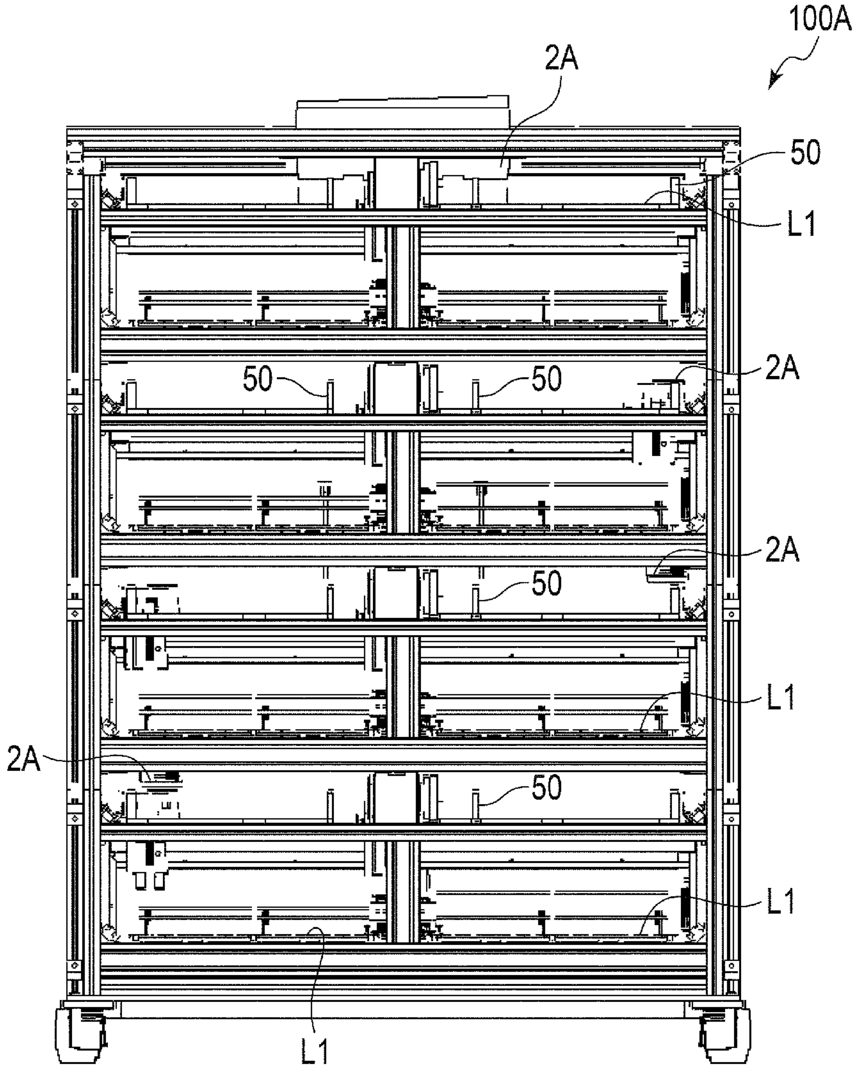
FIG. 18 is a side view of a storage apparatus according to a comparative example.
Figure 19:
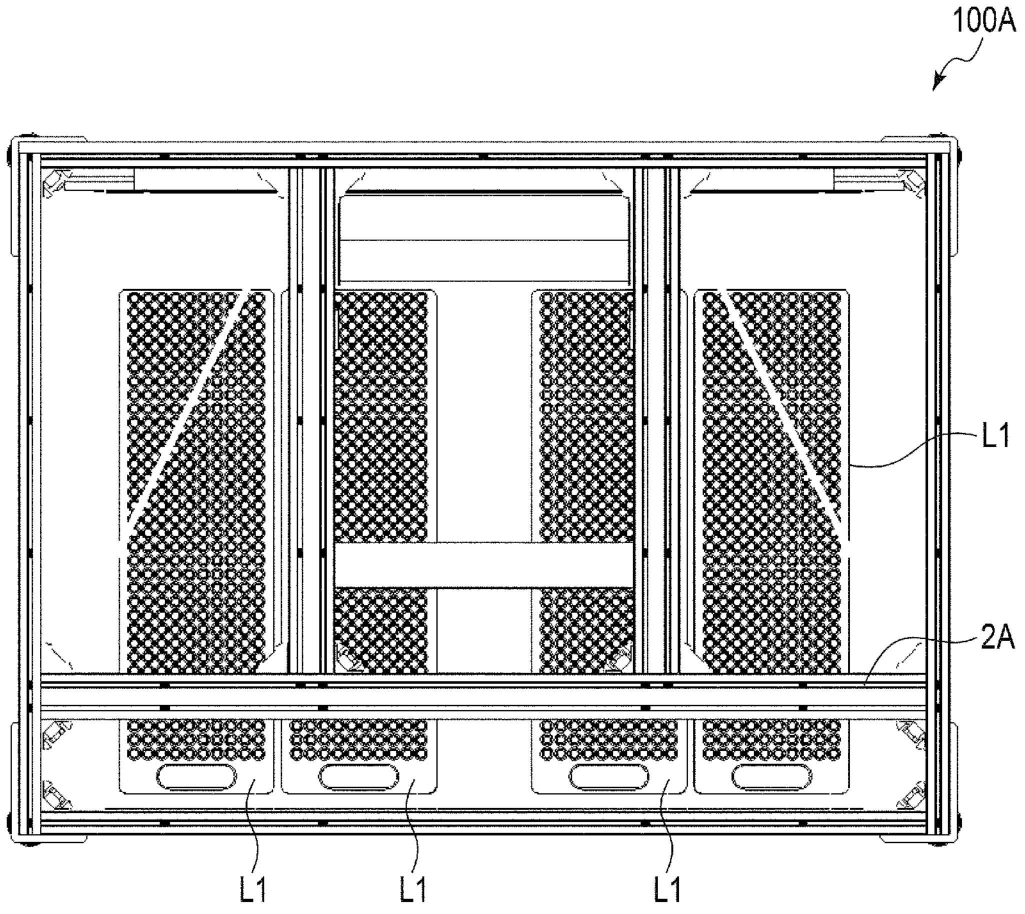
FIG. 19 is a plan view of the storage apparatus according to the comparative example.

As a comparative example of the number of specimen containers to be stored, in a storage apparatus 100A shown in FIGS. 18 and 19, four racks L1 each accommodating 340 specimen containers in the XY direction are arrayed in an area of, for example, 1200 mm in the X direction and 900 mm in the Y direction in each of four floors to mount 16 racks L1 in total, thereby storing 5440 specimen containers. On the other hand, in the storage apparatus 100 according to the present embodiment, three storage shelves 1 can be arrayed in an area of approximately 1200 mm in the X direction and 1400 mm in the Y direction, and 70 racks 20 can be stored in the front/back direction, with each rack 20 configured to store 12 specimen containers, thus storing 840 specimen containers on each floor in the storage shelf 1. With the six-floor configuration, the storage apparatus is configured in such a manner that 5040 specimen containers 50 in total can be arranged in the six-level lanes 31 and 32. By laterally arranging the three storage shelves 1 in a single housing to conserve space, up to 15120 specimen containers can be stored. That is, the storage apparatus 100 according to the present embodiment can efficiently utilize a footprint that is approximately 1.74 times larger than the conventional storage apparatus 100A according to the comparative example formed in a similar overall size, as shown in FIG. 20.

In addition, according to the storage apparatus 100 of the present embodiment, by providing engaging projections 22 at both ends of the racks 20 each holding a plurality of specimen containers 50 in the width direction and allowing the engaging projections 22 to be held in grooves of two plates 35 and 36 to conserve space, the racks 20 can be simultaneously moved, thus allowing parallel processing. By realizing a configuration that allows for movement and transfer with thin plates 35 and 36, for example, it is possible to efficiently use space.

It is to be noted that the present invention is not limited to the embodiments described above, and may be embodied in practice by modifying the components within the scope of the spirit of the invention.

For example, the specimen containers 50 to be stored in the storage shelf 1 may be of either the same type or different types. Also, the type of specimen containers 50 to be stored in the three movement units 30 may vary from one to another.

In the above-described embodiment, a loop-shaped circulation path is set; however, the movement path may be freely set. Moreover, in the above-described embodiment, the transfer device 2 is provided in the processing device 60 configured to perform various types of processing on the specimen containers 50; however, the configuration is not limited thereto. Furthermore, an example has been described in which the target of transfer is the specimen containers 50 mounted on the conveyor mechanism 61 of the processing device 60; however, the configuration is not limited thereto. For example, the target of transfer may be containers carried into another rack.

In the above-described embodiment, an example has been shown in which the racks 20 are operated row by row; however, the configuration is not limited thereto. For example, the racks 20 may be moved in two or more rows.

Moreover, an example has been shown in which three movement units 30 each including two lanes with opposite moving directions set in two vertical levels are provided; however, the configuration is not limited thereto. Furthermore, the operation in the supply lane 31 and the operation in the withdrawal lane 32 may be reversed.

The components exemplified in the above-described embodiment may be deleted, and the shape, structure, material, etc. of the components may be changed. By suitably combining the components disclosed in the above-described embodiment, various inventions can be formed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage apparatus, comprising:

a storage unit including a storage space configured to store a plurality of racks in a plurality of rows in a second direction intersecting a first direction, each of the racks holding a plurality of specimen containers in the first direction; and a plurality of movement units arranged in a plurality of levels in a third direction intersecting the first and second directions, each of the movement units being configured to: sequentially supply the rows of the racks supported by the storage unit to one side in the second direction toward a carry-in position by a predetermined pitch; move the racks in the third direction on a carry-in side; and sequentially withdraw the racks by the predetermined pitch to another side in the second direction, wherein each of the racks is configured to hold the specimen containers at least in the first direction, the storage unit is configured to support the racks arrayed in a plurality of rows in the second direction, the carry-in position is placed at an end portion of the storage unit in the second direction, the movement unit includes: a first movement section configured to move the racks arranged in the second direction to the one side in the second direction at the predetermined pitch; a second movement section configured to move the racks arranged in the second direction to another side in the second direction at the predetermined pitch; and a third movement section configured to move the racks at the carry-in position in the third direction between the first movement section and the second movement section, the first movement section and the second movement section are placed so as to be stacked in the third direction different from the first direction and the second direction, the first movement section includes:

a supporting plate including a plurality of engaging portions arranged in parallel in a front/back direction and each configured to be engaged with and disengaged from an end portion of the rack in the first direction; and a moving plate including a plurality of engaging portions arranged in parallel in the front/back direction and each configured to be engaged with and disengaged from an end portion of the rack in a width direction, the moving plate being movable in the front/back direction and an ascending and descending direction relative to the supporting plate, and the moving plate repeatedly performs an advancement process of advancing the racks by moving along a traveling route of ascending, advancing, descending, and retracting at the predetermined pitch relative to the supporting plate in a state in which a plurality of engaging portions of the racks are set in the engaging portions of the supporting plate, thereby sequentially advancing the racks to the one side in the second direction.

2. The storage apparatus according to claim 1, further comprising:

a transfer unit configured to transfer the specimen containers to the racks supplied to the carry-in position, wherein in the supplying or the withdrawing, the specimen containers are simultaneously moved in units of one or two rows in the second direction and five or more columns in the first direction.

3. The storage apparatus according to claim 1, further comprising:

a fourth movement section configured to move, at an end portion opposite the carry-in position, the rack at another end portion in the second position to a direction away from the third movement section in the third direction.

4. The storage apparatus according to claim 1, wherein the carry-in position is disposed at a front-end portion of the storage unit, three or more of the racks are arrayed in the front/back direction in the storage unit, each of the racks is configured to accommodate the specimen containers in a width direction intersecting a direction of movement of the supplying and the withdrawing, and the storage apparatus further comprises: a control unit configured to perform, in parallel:

a supplying step of causing the first movement section to move the rack from a back side to a front side;

a retracting step of causing the second movement section to move the transferred rack to the back side;

an ascending and descending step of causing the third movement section to move the rack in an up/down direction at a front end portion; and a carry-in step of causing the transfer unit to transfer the specimen containers in the width direction stored in the rack at the carry-in position of the front end portion.

5. The storage apparatus according to claim 1, wherein a plurality of the storage units are arranged in the first direction, and the storage apparatus further comprises: a housing configured to accommodate the storage units.

6. A storage method comprising performing, in parallel:

sequentially supplying a plurality of racks supported by a storage unit at a predetermined pitch to a carry-in position of the storage unit, the storage unit including a storage space configured to store the racks in a second direction intersecting a first direction, each of the racks holding in the first direction at least one specimen container amongst a plurality of specimen containers, the storage unit supporting the racks arrayed in a plurality of rows in the second direction, the carry-in position being placed at an end portion of the storage unit in the second direction;

transferring the specimen container to the rack supplied at the carry-in position; and sequentially moving the rack at the carry-in position to which the specimen containers have been transferred to the storage space at the predetermined pitch to withdraw the rack moving, with a first movement section of a movement unit, the racks arranged in the second direction to one side in the second direction at the predetermined pitch;

moving, with a second movement section of the movement unit, the racks arranged in the second direction to another side in the second direction at the predetermined pitch;

moving, with a third movement section of the movement unit, the racks at the carry-in position in the third direction between the first movement section and the second movement section, the first movement section and the second movement section being stacked in the third direction different from the first direction and the second direction, the first movement section including a supporting plate including a plurality of engaging portions arranged in parallel in a front/back direction and each configured to be engaged with and disengaged from an end portion of the rack in the first direction, and a moving plate including a plurality of engaging portions arranged in parallel in the front/back direction and each configured to be engaged with and disengaged from an end portion of the rack in a width direction, the moving plate being movable in the front/back direction and an ascending and descending direction relative to the supporting plate; and repeatedly performing, with the moving plate, an advancement process of advancing the racks by moving along a traveling route of ascending, advancing, descending, and retracting at the predetermined pitch relative to the supporting plate in a state in which a plurality of engaging portions of the racks are set in the engaging portions of the supporting plate, thereby sequentially advancing the racks to the one side in the second direction.

7. The storage method according to claim 6, wherein the rack holds a plurality of specimen containers arranged in a first direction, the carry-in position is disposed at an end portion in a second direction in the storage space, and the racks are moved in the second direction through the supplying and the withdrawing.

* * * * *